(12) United States Patent
Shenoy et al.

(10) Patent No.: US 9,587,328 B2
(45) Date of Patent: Mar. 7, 2017

(54) FINE FIBERS MADE FROM POLYMER CROSSLINKED WITH RESINOUS ALDEHYDE COMPOSITION

(71) Applicant: Donaldson Company, Inc., Bloomington, MN (US)

(72) Inventors: Suresh L. Shenoy, Bloomington, MN (US); Hoo Young Chung, Edina, MN (US); Thomas M. Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 803 days.

(21) Appl. No.: 13/624,064

(22) Filed: Sep. 21, 2012

(65) Prior Publication Data

US 2013/0068687 A1    Mar. 21, 2013

Related U.S. Application Data

(60) Provisional application No. 61/537,171, filed on Sep. 21, 2011, provisional application No. 61/620,251, filed on Apr. 4, 2012.

(51) Int. Cl.
*D02G 3/36* (2006.01)
*B01D 39/04* (2006.01)
(Continued)

(52) U.S. Cl.
CPC ......... *D01D 5/0038* (2013.01); *B01D 39/163* (2013.01); *D01F 6/90* (2013.01);
(Continued)

(58) Field of Classification Search
CPC .... B01D 2239/0233; B01D 2239/0622; B01D 2239/0627; B01D 2239/065;
(Continued)

(56) References Cited

U.S. PATENT DOCUMENTS 2,169,250 A    8/1939    Izard
2,265,742 A    12/1941   Norton, Jr. et al.
(Continued)

FOREIGN PATENT DOCUMENTS

CA    2117210 A1    9/1994
CA    2223731 A1    12/1996
(Continued)

OTHER PUBLICATIONS

U.S. Appl. No. 61/620,251, filed Apr. 4, 2012, Shenoy.
U.S. Appl. No. 61/537,171, filed Sep. 21, 2011, Shenoy.
International Search Report and Written Opinion for PCT/US2012/056511, issued by the European Patent Office, mailed Dec. 12, 2012: 9 pgs.
(Continued)

*Primary Examiner* — Dirk Bass
(74) *Attorney, Agent, or Firm* — Mueting, Raasch & Gebhardt, P.A.

(57) ABSTRACT

A fine fiber can be made having a structure with an axial core and a coating layer. The fiber can have a polymer core and one or two layers surrounding the core. The fine fiber can be made from a polymer material and a resinous aldehyde (e.g., melamine-aldehyde) composition such that the general structure of the fiber has a polymer core surrounded by at least a layer of the resinous aldehyde composition.

30 Claims, 16 Drawing Sheets

Figure 1:
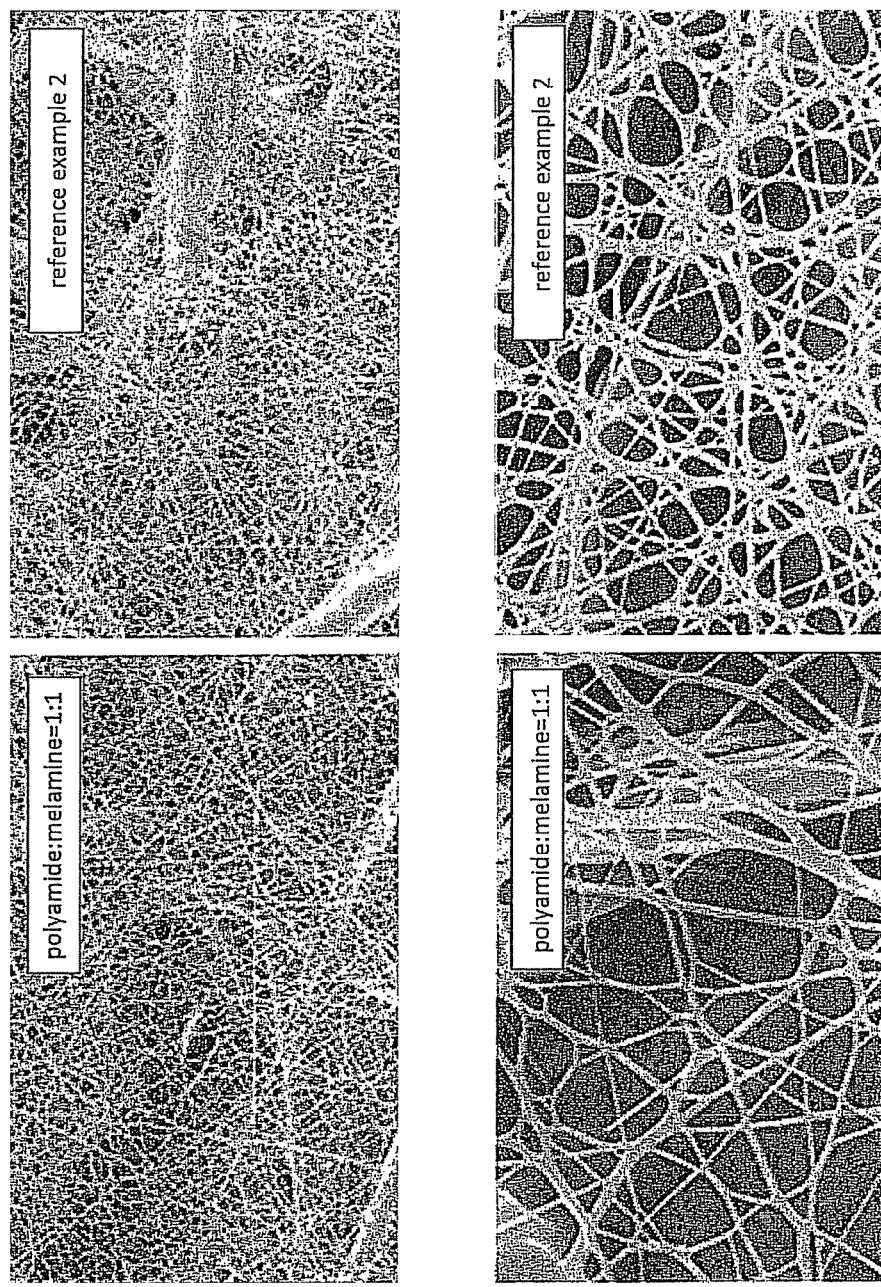

(51) Int. Cl.

| | | |
|---|---|---|
| *B01D 24/00* | (2006.01) | |
| *D01D 5/00* | (2006.01) | |
| *D01F 6/90* | (2006.01) | |
| *D01F 8/12* | (2006.01) | |
| *D01F 8/16* | (2006.01) | |
| *B01D 39/16* | (2006.01) | |

(52) U.S. Cl.
CPC .............. *D01F 8/12* (2013.01); *D01F 8/16* (2013.01); *B01D 2239/0233* (2013.01); *B01D 2239/065* (2013.01); *B01D 2239/0622* (2013.01); *B01D 2239/0627* (2013.01); *Y10T 428/2938* (2015.01)

(58) Field of Classification Search
CPC ...... B01D 39/163; D01D 5/0038; D01F 6/90; D01F 8/12; D01F 8/16; Y10T 428/2938
USPC .......................................... 210/504; 428/378
See application file for complete search history.

(56) References Cited

U.S. PATENT DOCUMENTS

| | | | |
|---|---|---|---|
| 2,384,947 A | 9/1945 | Matheson | |
| 2,443,450 A | 6/1948 | Boynton et al. | |
| 2,484,523 A | 10/1949 | McClellan | |
| 3,284,178 A | 11/1966 | Timmer et al. | |
| 3,980,605 A | 9/1976 | Steigelmann et al. | |
| 3,998,690 A * | 12/1976 | Lyness et al. ................ | 162/141 |
| 4,088,620 A * | 5/1978 | Nihongi et al. ............. | 524/503 |
| 4,113,912 A | 9/1978 | Okita | |
| 4,399,091 A | 8/1983 | Eisenstein et al. | |
| 4,469,606 A | 9/1984 | Reid et al. | |
| 4,603,083 A | 7/1986 | Tanaka et al. | |
| 4,650,506 A | 3/1987 | Barris et al. | |
| 4,698,194 A | 10/1987 | Tanaka et al. | |
| 4,992,515 A * | 2/1991 | Ballard ........................ | 525/428 |
| 5,143,954 A | 9/1992 | Hutton et al. | |
| 5,166,246 A | 11/1992 | Gallucci et al. | |
| 2,338,570 A | 1/1994 | Childs | |
| 5,314,513 A | 5/1994 | Miller et al. | |
| 5,340,522 A | 8/1994 | Taniguchi et al. | |
| 5,364,456 A | 11/1994 | Kahlbaugh et al. | |
| 5,672,399 A | 9/1997 | Kahlbaugh et al. | |
| 5,766,158 A | 6/1998 | Opolski | |
| 5,779,960 A | 7/1998 | Berlowitz et al. | |
| 5,855,832 A | 1/1999 | Clausi | |
| 5,908,477 A | 6/1999 | Harmer et al. | |
| 5,914,299 A | 6/1999 | Harmer et al. | |
| 5,919,716 A | 7/1999 | Raynolds et al. | |
| 6,117,226 A | 9/2000 | Dial et al. | |
| 6,165,572 A | 12/2000 | Kahlbaugh et al. | |
| 6,174,601 B1 | 1/2001 | Stanitis et al. | |
| 6,221,152 B1 | 4/2001 | Dial et al. | |
| 6,268,440 B1 * | 7/2001 | Kudo et al. .................. | 525/477 |
| 6,339,116 B1 | 1/2002 | Afzali et al. | |
| 6,368,386 B1 | 4/2002 | Nelson et al. | |
| 6,368,544 B1 | 4/2002 | Owens | |
| 6,419,787 B2 | 7/2002 | Goulet et al. | |
| 6,537,670 B1 | 3/2003 | Sassi | |
| 6,641,773 B2 | 11/2003 | Kleinmeyer et al. | |
| 6,673,136 B2 | 1/2004 | Gillingham et al. | |
| 6,686,051 B1 | 2/2004 | Weinert et al. | |
| 6,716,274 B2 | 4/2004 | Gogins et al. | |
| 6,730,723 B2 | 5/2004 | Frick et al. | |
| 6,740,142 B2 | 5/2004 | Buettner et al. | |
| 6,743,273 B2 | 6/2004 | Chung et al. | |
| 6,746,517 B2 | 6/2004 | Benson et al. | |
| 6,794,032 B2 | 9/2004 | Borgner et al. | |
| 6,800,117 B2 | 10/2004 | Barris et al. | |
| 6,811,653 B2 | 11/2004 | Huang | |
| 6,841,023 B2 | 1/2005 | Mott | |
| 6,855,743 B1 | 2/2005 | Gvozdic | |
| 6,867,250 B1 | 3/2005 | Gupta et al. | |
| 6,875,256 B2 | 4/2005 | Gillingham et al. | |
| 6,924,028 B2 | 8/2005 | Chung et al. | |
| 6,955,775 B2 | 10/2005 | Chung et al. | |
| 6,974,490 B2 | 12/2005 | Gillingham et al. | |
| 6,994,742 B2 | 2/2006 | Barris et al. | |
| 7,008,465 B2 | 3/2006 | Graham et al. | |
| 7,070,640 B2 | 7/2006 | Chung et al. | |
| 7,090,715 B2 | 8/2006 | Chung et al. | |
| 7,115,150 B2 | 10/2006 | Johnson et al. | |
| 7,179,317 B2 | 2/2007 | Chung et al. | |
| 7,270,692 B2 | 9/2007 | Gillingham et al. | |
| 7,270,693 B2 | 9/2007 | Chung et al. | |
| 7,316,723 B2 | 1/2008 | Chung et al. | |
| 7,318,852 B2 | 1/2008 | Chung et al. | |
| 7,318,853 B2 | 1/2008 | Chung et al. | |
| 7,615,567 B2 | 11/2009 | Carroll | |
| 7,641,055 B2 | 1/2010 | Ferrer et al. | |
| 7,799,169 B2 | 9/2010 | Bhat et al. | |
| 7,807,743 B2 | 10/2010 | Green et al. | |
| 7,927,540 B2 | 4/2011 | Smithies et al. | |
| 7,943,566 B2 | 5/2011 | Uitenbroek et al. | |
| 7,947,644 B2 | 5/2011 | Uitenbroek et al. | |
| 7,988,860 B2 | 8/2011 | Kalayci et al. | |
| 8,029,588 B2 | 10/2011 | Chung et al. | |
| 8,084,523 B2 | 12/2011 | Lopez et al. | |
| 8,118,901 B2 | 2/2012 | Chung et al. | |
| 8,309,225 B2 | 11/2012 | Rodgers | |
| 8,349,764 B2 | 1/2013 | Burba, III | |
| 8,366,797 B2 | 2/2013 | Chung et al. | |
| 8,403,151 B2 | 3/2013 | Cheng et al. | |
| 8,512,431 B2 | 8/2013 | Chung et al. | |
| 2001/0042605 A1 | 11/2001 | Goulet et al. | |
| 2001/0049421 A1 | 12/2001 | Burlone | |
| 2002/0059868 A1 | 5/2002 | Gogins et al. | |
| 2002/0073667 A1 | 6/2002 | Barris et al. | |
| 2002/0073849 A1 | 6/2002 | Buettner et al. | |
| 2002/0096255 A1 | 7/2002 | Mott | |
| 2002/0176986 A1 | 11/2002 | Watanabe et al. | |
| 2002/0198355 A1 | 12/2002 | Wonner et al. | |
| 2003/0037675 A1 | 2/2003 | Gillingham et al. | |
| 2003/0073799 A1 | 4/2003 | Frick et al. | |
| 2003/0079846 A1 | 5/2003 | Huang | |
| 2003/0092814 A1 | 5/2003 | Borgner et al. | |
| 2003/0106294 A1 | 6/2003 | Chung et al. | |
| 2003/0224936 A1 | 12/2003 | Kretzschmar | |
| 2004/0060268 A1 | 4/2004 | Chung et al. | |
| 2004/0060269 A1 | 4/2004 | Chung et al. | |
| 2004/0060677 A1 | 4/2004 | Huang | |
| 2004/0087706 A1 * | 5/2004 | Fish et al. ..................... | 524/494 |
| 2004/0096656 A1 | 5/2004 | Bond | |
| 2004/0123572 A1 | 7/2004 | Chung et al. | |
| 2004/0134353 A1 | 7/2004 | Gillingham et al. | |
| 2004/0142107 A1 | 7/2004 | Eriksson et al. | |
| 2004/0166751 A1 | 8/2004 | Peng et al. | |
| 2004/0187454 A1 | 9/2004 | Chung et al. | |
| 2004/0197468 A1 | 10/2004 | Geel et al. | |
| 2004/0200354 A1 | 10/2004 | Barris et al. | |
| 2004/0203306 A1 | 10/2004 | Grafe et al. | |
| 2004/0223040 A1 | 11/2004 | Graham et al. | |
| 2005/0070186 A1 | 3/2005 | Shoemake et al. | |
| 2005/0229814 A1 | 10/2005 | Muvundamina | |
| 2005/0235619 A1 | 10/2005 | Heinz | |
| 2005/0287383 A1 | 12/2005 | Taylor et al. | |
| 2006/0042767 A1 | 3/2006 | Bhat et al. | |
| 2006/0098342 A1 | 5/2006 | Matsumoto et al. | |
| 2006/0117730 A1 | 6/2006 | Chung et al. | |
| 2006/0187491 A1 | 8/2006 | Sakai | |
| 2006/0196359 A1 | 9/2006 | Gillingham et al. | |
| 2006/0216536 A1 | 9/2006 | Liu et al. | |
| 2006/0231487 A1 | 10/2006 | Bartley et al. | |
| 2006/0234027 A1 | 10/2006 | Huusken | |
| 2007/0012007 A1 | 1/2007 | Chung et al. | |
| 2007/0082393 A1 | 4/2007 | Lodhi et al. | |
| 2007/0129751 A1 | 6/2007 | Muni et al. | |
| 2007/0178788 A1 | 8/2007 | Link et al. | |
| 2007/0204769 A1 | 9/2007 | Wong et al. | |
| 2007/0237807 A1 | 10/2007 | Luu et al. | |
| 2008/0008865 A1 | 1/2008 | Luu et al. | |
| 2008/0076313 A1 | 3/2008 | Uitenbroek et al. | |
| 2008/0076314 A1 | 3/2008 | Blanz et al. | |

(56) References Cited

U.S. PATENT DOCUMENTS

| | | |
|---|---|---|
| 2008/0076868 A1 | 3/2008 | Green et al. |
| 2008/0107698 A1 | 5/2008 | Luu et al. |
| 2008/0110822 A1 | 5/2008 | Chung et al. |
| 2008/0157036 A1 | 7/2008 | Ogawa et al. |
| 2008/0179790 A1 | 7/2008 | Wong et al. |
| 2008/0187739 A1 | 8/2008 | Baker et al. |
| 2008/0307971 A1 | 12/2008 | Horie et al. |
| 2009/0004393 A1 | 1/2009 | Rodgers |
| 2009/0032475 A1 | 2/2009 | Ferrer et al. |
| 2009/0062413 A1 | 3/2009 | Adur et al. |
| 2009/0065436 A1 | 3/2009 | Kalayci et al. |
| 2009/0110843 A1 | 4/2009 | Halahmi et al. |
| 2009/0130377 A1 | 5/2009 | Samanta et al. |
| 2010/0021513 A1 | 1/2010 | Garois et al. |
| 2010/0064645 A1 | 3/2010 | Chung et al. |
| 2010/0116179 A1 | 5/2010 | Baker et al. |
| 2010/0178507 A1 | 7/2010 | Ferrer et al. |
| 2010/0269995 A1 | 10/2010 | Gupta et al. |
| 2011/0009532 A1 | 1/2011 | Luethge et al. |
| 2011/0042316 A1 | 2/2011 | Chen et al. |
| 2011/0047719 A1 | 3/2011 | Yeh et al. |
| 2011/0067369 A1 | 3/2011 | Chung et al. |
| 2011/0230586 A1 | 9/2011 | Schwalm et al. |
| 2012/0085567 A1 | 4/2012 | Lintz et al. |
| 2013/0068687 A1 | 3/2013 | Shenoy et al. |
| 2013/0199992 A1 | 8/2013 | Chung et al. |
| 2014/0196420 A1 | 7/2014 | Chung et al. |
| 2014/0230390 A1 | 8/2014 | Shenoy et al. |
| 2015/0013295 A1 | 1/2015 | Uchiyama et al. |

FOREIGN PATENT DOCUMENTS

| | | |
|---|---|---|
| CA | 2264675 A1 | 1/1998 |
| CA | 2295100 A1 | 12/1998 |
| CA | 2335580 A1 | 12/1999 |
| CA | 2336246 A1 | 12/1999 |
| CA | 2365444 A1 | 9/2000 |
| CA | 2025430 C | 1/2001 |
| CA | 2382274 A1 | 3/2001 |
| CA | 2419779 A1 | 3/2002 |
| CA | 2419802 A1 | 3/2002 |
| CA | 2570132 A1 | 12/2005 |
| CA | 2570670 A1 | 12/2005 |
| CA | 2517552 A1 | 3/2006 |
| CA | 2529822 A1 | 6/2006 |
| CA | 2605155 A1 | 10/2006 |
| CA | 2358668 C | 12/2006 |
| CA | 2630112 A1 | 8/2007 |
| CA | 2853954 A1 | 11/2007 |
| CA | 2653597 A1 | 1/2008 |
| CA | 2628054 A1 | 3/2008 |
| CA | 2675343 A1 | 7/2008 |
| CA | 2710273 A1 | 7/2009 |
| CA | 2419784 C | 8/2010 |
| CA | 2709631 A1 | 1/2011 |
| CA | 2450016 C | 2/2011 |
| CA | 2419770 C | 6/2011 |
| CN | 1177032 A | 3/1998 |
| CN | 1185180 C | 1/2005 |
| CN | 1203925 C | 6/2005 |
| CN | 1232335 C | 12/2005 |
| CN | 1318512 C | 5/2007 |
| CN | 101175634 A | 5/2008 |
| CN | 101325934 A | 12/2008 |
| CN | 101478876 A | 7/2009 |
| CN | 101517022 A | 8/2009 |
| CN | 1964827 B | 5/2010 |
| CN | 102414369 A | 4/2012 |
| CN | 102460603 A | 5/2012 |
| CN | 1997558 B | 6/2012 |
| CN | 101478953 B | 10/2012 |
| DE | 4129326 A1 | 3/1993 |
| DE | 69620173 T2 | 11/2002 |
| DE | 69716953 T2 | 8/2003 |
| EP | 0 351 046 A2 | 1/1990 |
| EP | 0 489 395 A1 | 6/1992 |
| EP | 0418093 B1 | 1/1995 |
| EP | 0851950 B1 | 9/1999 |
| EP | 1036492 A1 | 9/2000 |
| EP | 1 294 561 B1 | 6/2001 |
| EP | 0830327 B1 | 3/2002 |
| EP | 1201380 A2 | 5/2002 |
| EP | 0958116 B1 | 11/2002 |
| EP | 1305991 A1 | 5/2003 |
| EP | 1164826 B1 | 10/2004 |
| EP | 1245547 B1 | 6/2005 |
| EP | 1280852 B1 | 7/2005 |
| EP | 1089985 B1 | 9/2005 |
| EP | 1236564 B1 | 4/2006 |
| EP | 1672656 A2 | 6/2006 |
| EP | 1733776 A2 | 12/2006 |
| EP | 1317317 B1 | 5/2007 |
| EP | 1326698 B1 | 5/2007 |
| EP | 1795249 A1 | 6/2007 |
| EP | 1404514 B1 | 8/2007 |
| EP | 1467861 B1 | 5/2008 |
| EP | 1755844 B1 | 3/2010 |
| EP | 2202358 A1 | 6/2010 |
| EP | 1893793 B1 | 9/2010 |
| EP | 2 287 372 | 2/2011 |
| EP | 1275778 B1 | 2/2011 |
| EP | 2308582 A1 | 4/2011 |
| EP | 2225076 B1 | 7/2011 |
| EP | 1448841 B1 | 12/2011 |
| EP | 2402379 A1 | 1/2012 |
| EP | 1 358 272 B1 | 11/2012 |
| GB | 584 985 A | 1/1947 |
| GB | 854 987 A | 11/1960 |
| GB | 1376756 A | 12/1974 |
| GB | 1 379 875 A | 1/1975 |
| GB | 1 424 698 | 2/1976 |
| GB | 2464085 A | 4/2010 |
| JP | 10317275 A | 2/1998 |
| JP | 10317275 A | 12/1998 |
| JP | 2003-336127 A | 11/2003 |
| JP | 2004-508169 A | 3/2004 |
| JP | 2005-527358 A | 9/2005 |
| JP | 4167897 B2 | 10/2008 |
| JP | 5009479 B2 | 8/2012 |
| KR | 2002-069346 A | 8/2002 |
| KR | 10-2007-029195 A | 3/2007 |
| KR | 10-2007-037442 A | 4/2007 |
| KR | 10-0774863 B1 | 11/2007 |
| KR | 10-0811569 B1 | 3/2008 |
| KR | 10-0819356 B1 | 4/2008 |
| KR | 10-0887167 B1 | 3/2009 |
| KR | 10-0924484 B1 | 11/2009 |
| KR | 10-0930327 B1 | 12/2009 |
| RU | 2008127494 A | 1/2010 |
| WO | WO 93/04007 A1 | 3/1993 |
| WO | WO 94/04330 A1 | 3/1994 |
| WO | WO 94/18364 A1 | 8/1994 |
| WO | WO 95/04709 A1 | 2/1995 |
| WO | WO 96/20971 A1 | 7/1996 |
| WO | WO 96/40599 A1 | 12/1996 |
| WO | WO 98/00272 A1 | 1/1998 |
| WO | WO 98/58769 A1 | 12/1998 |
| WO | WO 99/36620 | 7/1999 |
| WO | WO 99/62705 A1 | 12/1999 |
| WO | WO 00/43132 A1 | 7/2000 |
| WO | WO 00/54568 A1 | 9/2000 |
| WO | WO 01/16048 A1 | 3/2001 |
| WO | WO 01/29312 A1 | 4/2001 |
| WO | WO 02/20133 A2 | 3/2002 |
| WO | WO 02/20135 A2 | 3/2002 |
| WO | WO 02/20668 | 3/2002 |
| WO | WO 02/20668 A2 | 3/2002 |
| WO | WO 02/34848 | 5/2002 |
| WO | WO 03/002338 A1 | 1/2003 |
| WO | WO 03/061964 A1 | 7/2003 |
| WO | WO 2005/063502 A2 | 7/2005 |
| WO | WO 2005/120787 A1 | 12/2005 |
| WO | WO 2005/120967 A1 | 12/2005 |
| WO | WO 2006/111458 A1 | 10/2006 |

(56) References Cited

FOREIGN PATENT DOCUMENTS

| | | |
|---|---|---|
| WO | WO 2006/126930 A1 | 11/2006 |
| WO | WO 2007/020644 A1 | 2/2007 |
| WO | WO 2007/020657 A1 | 2/2007 |
| WO | WO 2007/097818 A2 | 8/2007 |
| WO | WO 2007/097924 A2 | 8/2007 |
| WO | WO 2007/126777 A2 | 11/2007 |
| WO | WO 2008/002420 A2 | 1/2008 |
| WO | 10-2008-027229 A | 3/2008 |
| WO | WO 2008/036473 A1 | 3/2008 |
| WO | WO 2008/088815 A1 | 7/2008 |
| WO | WO 2008/143100 A1 | 11/2008 |
| WO | WO 2009/006163 A2 | 1/2009 |
| WO | WO 2009/064767 A2 | 5/2009 |
| WO | WO 2009/064767 A3 | 5/2009 |
| WO | WO 2009/147415 A1 | 12/2009 |
| WO | WO 2009/152439 A1 | 12/2009 |
| WO | WO 2010/123580 A1 | 10/2010 |
| WO | WO 2010/141757 A2 | 12/2010 |
| WO | WO 2012/001154 A1 | 1/2012 |
| WO | WO 2012/131370 A1 | 10/2012 |

OTHER PUBLICATIONS

International Search Report and Written Opinion for PCT/US2012/056545, issued by the United States Patent Office, mailed Jan. 18, 2013; 14 pgs.

"CYMEL® Amino Resin Crosslinkers for the Coating Industry," Product and Application Guide [online]. Cytec Industries, Inc., Woodland Park, NJ, 2008 [retrieved on Feb. 1, 2013]. Retrieved from the Internet:<URL: http://www.cytec.com/liquids/Downloads/CYMEL__AminoResinCrosslinkers.pdf>; 42pgs.

U.S. Appl. No. 14/163,262, filed Jan. 24, 2014.

Partial Supplemental European Search Report for EP Application No. 12833177.4 dated Mar. 5, 2015; 5 pgs.

Donaldson®Torit®ULTRA-Web® datasheet. Donaldson Company, Inc., Minneapolis, Minnesota 2007; 6 pgs.

Lee et al. "Preparation and characterization of polu(vinly alcohol) nanofiber mats crosslinked with blocked isocyanate prepolymer," *Polymer International Barking*, Jan. 1, 2010; 59:1583-1684.

Reneker et al. "Nanometre diameter fibers of polymer, produced by electrospinning," *Nanotechnology*, 1996; 7:216-23.

\* cited by examiner

FIG. 9
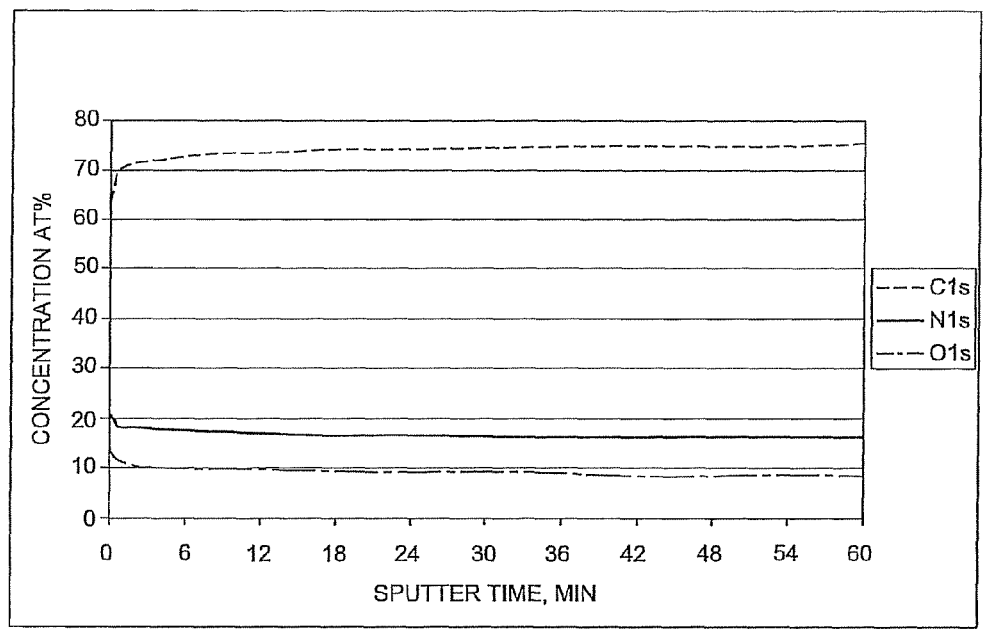
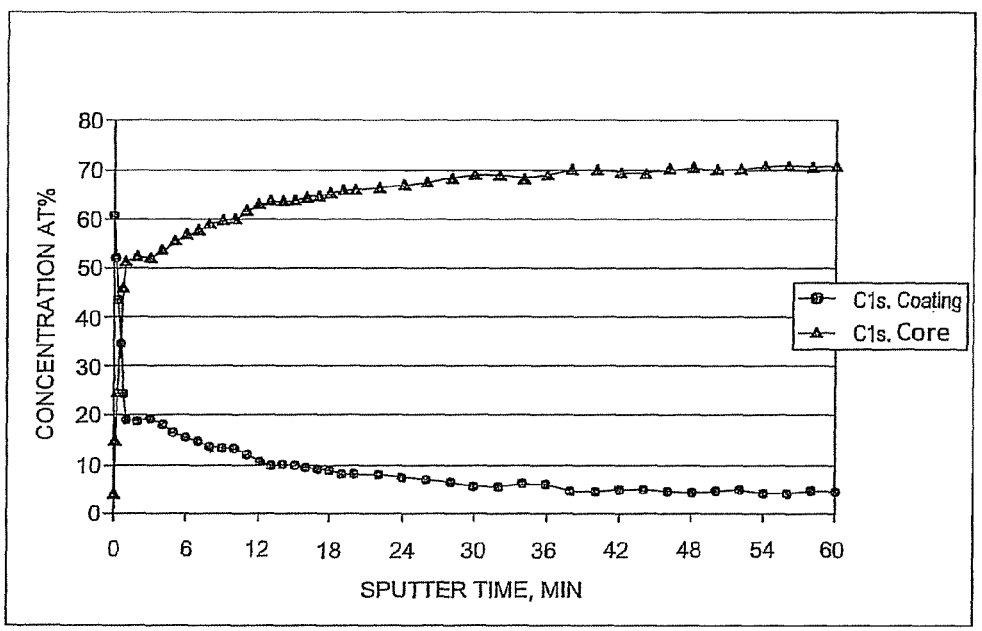

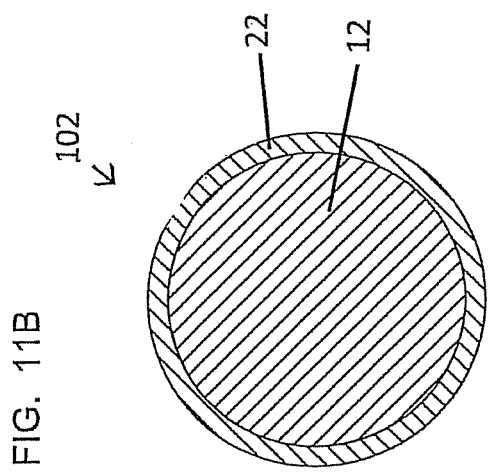
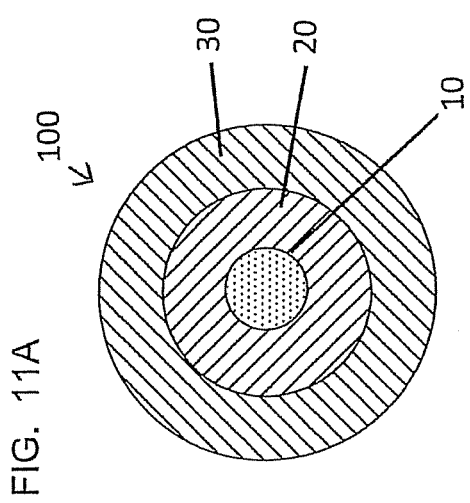

FINE FIBERS MADE FROM POLYMER CROSSLINKED WITH RESINOUS ALDEHYDE COMPOSITION

CROSS-REFERENCE TO RELATED APPLICATIONS

The present application claims priority to U.S. Provisional Application Ser. No. 61/620,251, filed on Apr. 4, 2012, and U.S. Provisional Application Ser. No. 61/537,171, filed on Sep. 21, 2011, both of which are incorporated herein by reference in their entirety.

BACKGROUND OF THE DISCLOSURE

Recent technologies have been used to form layers of fine fiber. Fine fiber technologies that contemplate polymeric materials mixed or blended with a variety of other substances are disclosed in, for example Chung et al., U.S. Pat. No. 6,743,273. These fibers have found commercial acceptance in certain filtration applications in which a layer of fine fiber is found on a filtration substrate. Certain of the disclosed fibers comprise an axial core comprising a phase comprising polymer materials. Surrounding the axial core can be found a layer of a coating material such as a phenolic oligomer or a fluoropolymer component. In the formation of these fibers, a solution of the polymer and additive is formed by melt processes or electrospun to form the fiber.

SUMMARY

A unique fine fiber material is formed by mixing or blending a polymer material with a resinous aldehyde composition. In certain embodiments, the aldehyde composition is a melamine-aldehyde composition. When formed into a fiber, the mixture or blend of polymer material and resinous aldehyde composition, at appropriate ratios, forms at least two (e.g., concentric or coaxial) phases. The first phase is an internal core or axial polymer phase that includes the polymer material. Herein, "internal core," "core phase," "first phase," and "axial phase" are used interchangeably. The first core phase is surrounded by a second (coating) phase that includes the resinous aldehyde composition.

Depending on the polymer material chosen and the type and amount of resinous aldehyde composition selected, some proportion of the resinous aldehyde can crosslink adjacent polymer chains residing in the core or axial polymer phase. In other words, some proportion of the resinous aldehyde composition causes some degree of crosslinking of available active hydrogen moieties (i.e., groups) that are pendent groups or groups in the polymer backbone present in the internal core or axial polymer phase. With the use of appropriate ratios of polymer material and resinous aldehyde composition in the fiber formation, in some embodiments, the resinous aldehyde composition can also form an additional outer coating phase surrounding the axial crosslinked polymer phase.

Accordingly, in one embodiment of the disclosure, a fine fiber comprises an internal axial polymer phase comprising a mixture of the polymer material and a resinous aldehyde composition, wherein the resinous aldehyde composition can crosslink available active hydrogen groups of the polymer material. In this embodiment the internal axial polymer phase is surrounded by a second coating phase including a layer of resinous aldehyde (e.g., melamine-formaldehyde) composition with little or no polymer material in the second (coating) phase. In such embodiments, any polymer material in the second coating phase may be present as a dispersed phase or minor phase.

In a second embodiment of the disclosure, the fine fiber comprises three phases. In this embodiment, an internal axial polymer phase (or core phase) includes the polymer material, preferably, with little or no resinous aldehyde composition. Surrounding the internal axial polymer phase is a second coating phase (i.e., a transition layer or transition phase) comprising a mixture or blend of the polymer material and a resinous aldehyde. The solid resinous aldehyde composition crosslinks available active hydrogen groups of the polymer material. The fiber additionally contains a third exterior phase (i.e., the outermost coating) comprising resinous aldehyde composition.

In a third embodiment of the disclosure, the fine fiber of either the two-layer (i.e., two-phase) or three-layer (i.e., three-phase) embodiments disclosed above includes a polymer material that is a nylon polymer and a resinous aldehyde composition that is a melamine-formaldehyde resin. In this embodiment, the nylon polymer contains reactive —NH— groups in the polymer backbone that are available for reaction with the melamine-formaldehyde material.

Thus, the present disclosure provides a fine fiber comprising a core phase and a coating phase, wherein the core phase comprises a polymer and the coating phase comprises a resinous aldehyde composition; wherein at least a portion of the polymer is crosslinked by the resinous aldehyde composition.

Herein, a "fine" fiber has an average fiber diameter of no greater than 10 microns. Typically, this means that a sample of a plurality of fibers of the present disclosure has an average fiber diameter of no greater than 10 microns.

The fine fiber of the present disclosure is preferably prepared from a resinous aldehyde composition comprising alkoxy groups and a polymer comprising active hydrogen groups, wherein the molar ratio of resinous aldehyde composition to polymer is such that the molar ratio of alkoxy groups to active hydrogen groups is greater than 10:100.

In certain embodiments, it was found that when using a weight ratio of resinous aldehyde composition to polymer of at least 20:100, and preferably greater than 20:100 (20 parts by weight resinous aldehyde composition per 100 parts by weight of the polymer) that a useful exterior phase including resinous aldehyde composition forms around the core polymer. The exterior coating layer of resinous aldehyde composition (e.g., melamine-formaldehyde) provides improved properties, such as humidity resistance, to the fine fibers and fine fiber layers of the disclosure, relative to commercially available fibers and fiber layers.

Thus, the present disclosure also provides a fine fiber comprising a core phase and a coating phase; wherein the core phase comprises nylon and the coating phase comprises a resinous melamine-aldehyde composition; wherein at least a portion of the nylon is crosslinked by the resinous melamine-aldehyde composition; and further wherein the fine fiber is prepared from a resinous melamine-aldehyde composition in an amount of greater than 20 parts by weight per 100 parts by weight of the nylon.

In these embodiments, a layer of fine fiber can be manufactured by forming a plurality of fine fibers on a filtration substrate, thereby forming a filter media. The filter media (i.e., fine fiber layer plus filtration substrate) can then be manufactured into filter elements (i.e., filtration elements), including, e.g., flat-panel filters, cartridge filters, or other filtration components.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings, in which FIGS. 1 through 16 comprise test data and results that demonstrate the structure and nature of fine fiber materials made from a mixture or blend of polymer material and resinous aldehyde composition.

FIG. 1 compares the SEM images of the fibers obtained from Reference Example 2 and a fiber of Example 9 ("polyamide:melamine=1:1" or nylon:melamine-formaldehyde weight ratio of 1:1).

Figure 2:
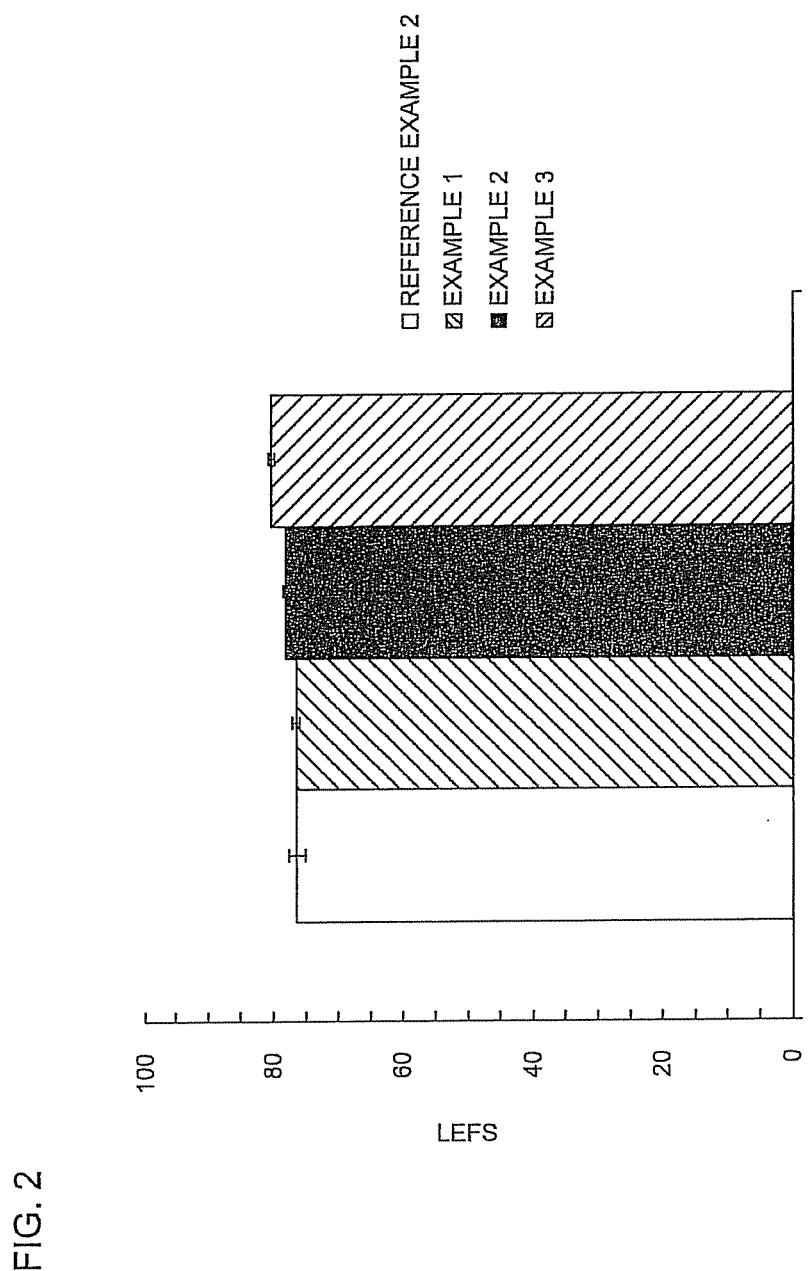

FIG. 2 graphically shows the filtration efficiency (LEFS) for the fine fibers of Examples 1-3 and Reference Example 2.

Figure 3:
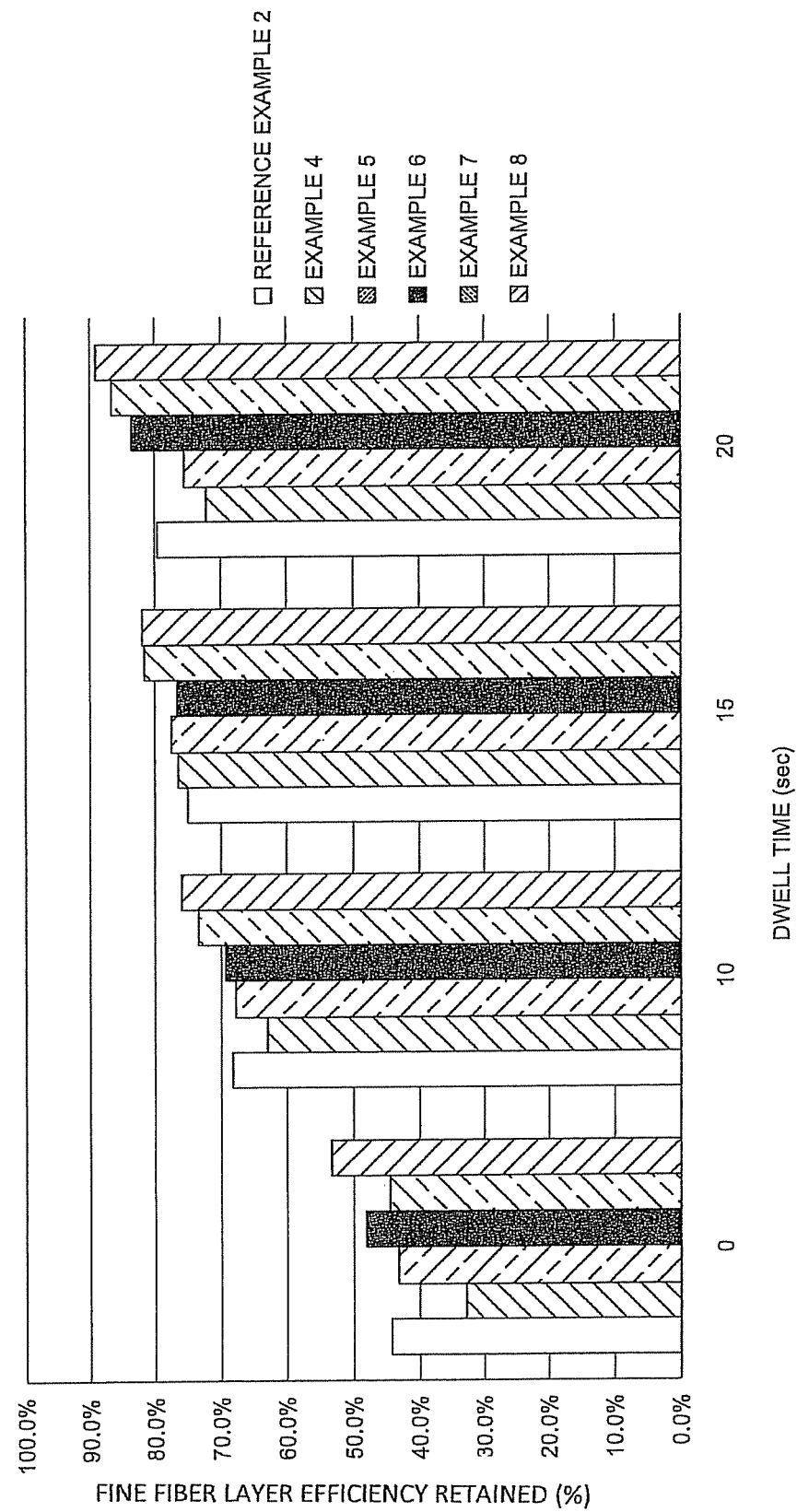

FIG. 3 compares the crosslinking kinetics of the fiber of Reference Example 2 (a methoxy-methyl nylon-6) with fine fibers of the present disclosure by comparing the amount of fine fiber layer efficiency retained after an ethanol soak test (for 1 min). Dwell time refers to the exposure time at an elevated temperature to which the samples were subjected after fiber formation.

Figure 4A:
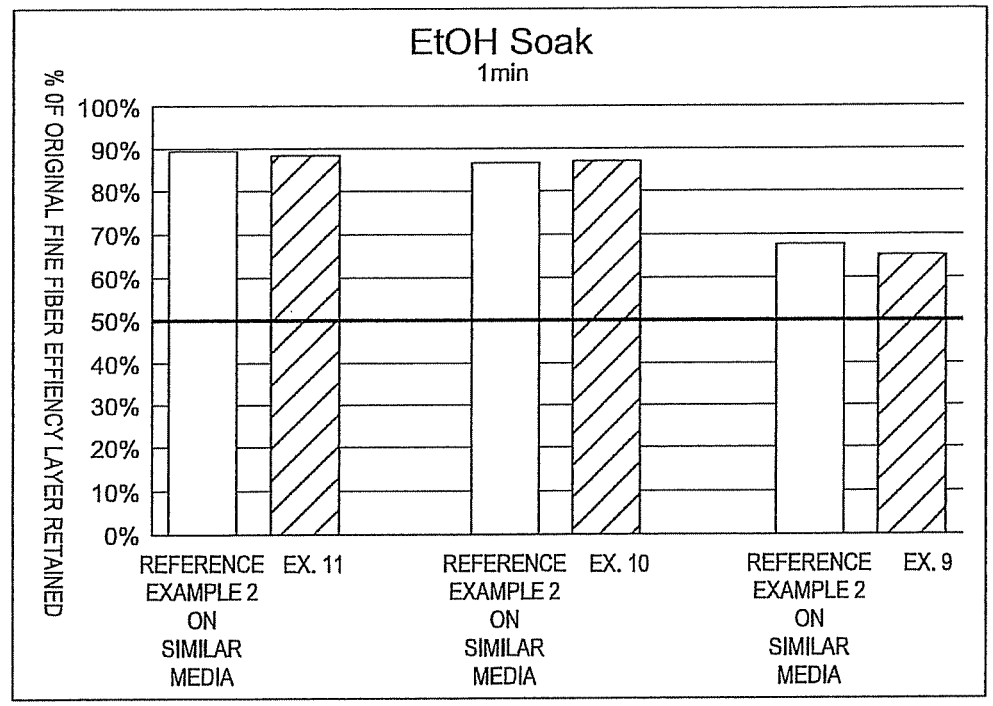
Figure 4B:
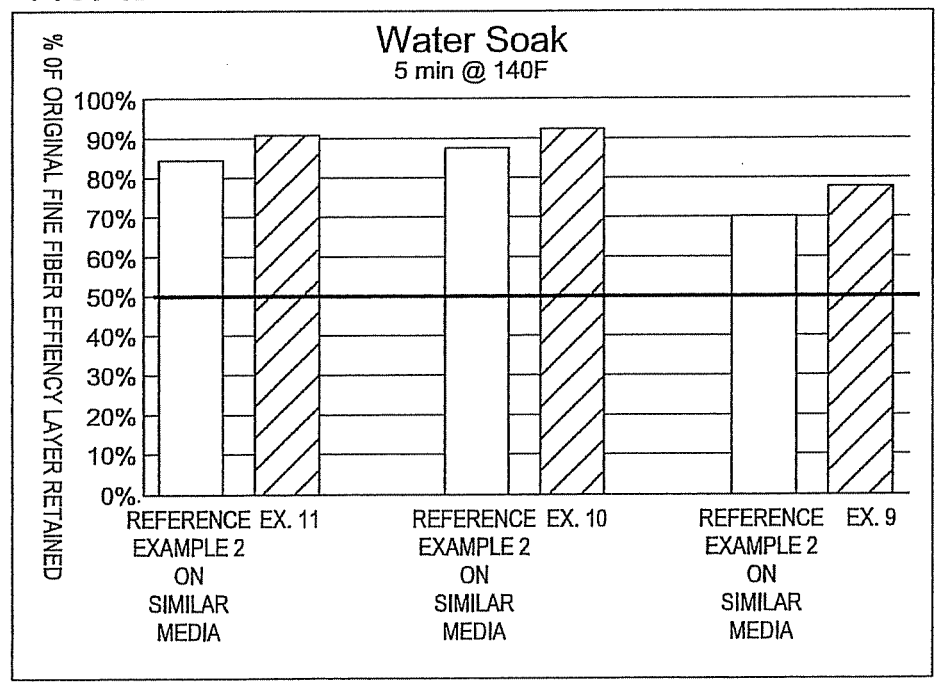

FIGS. 4A and 4B show the fine fiber layer efficiency retained following ethanol and hot water soak tests for the fibers of Examples 9-11 compared to Reference Example 2.

Figure 5:
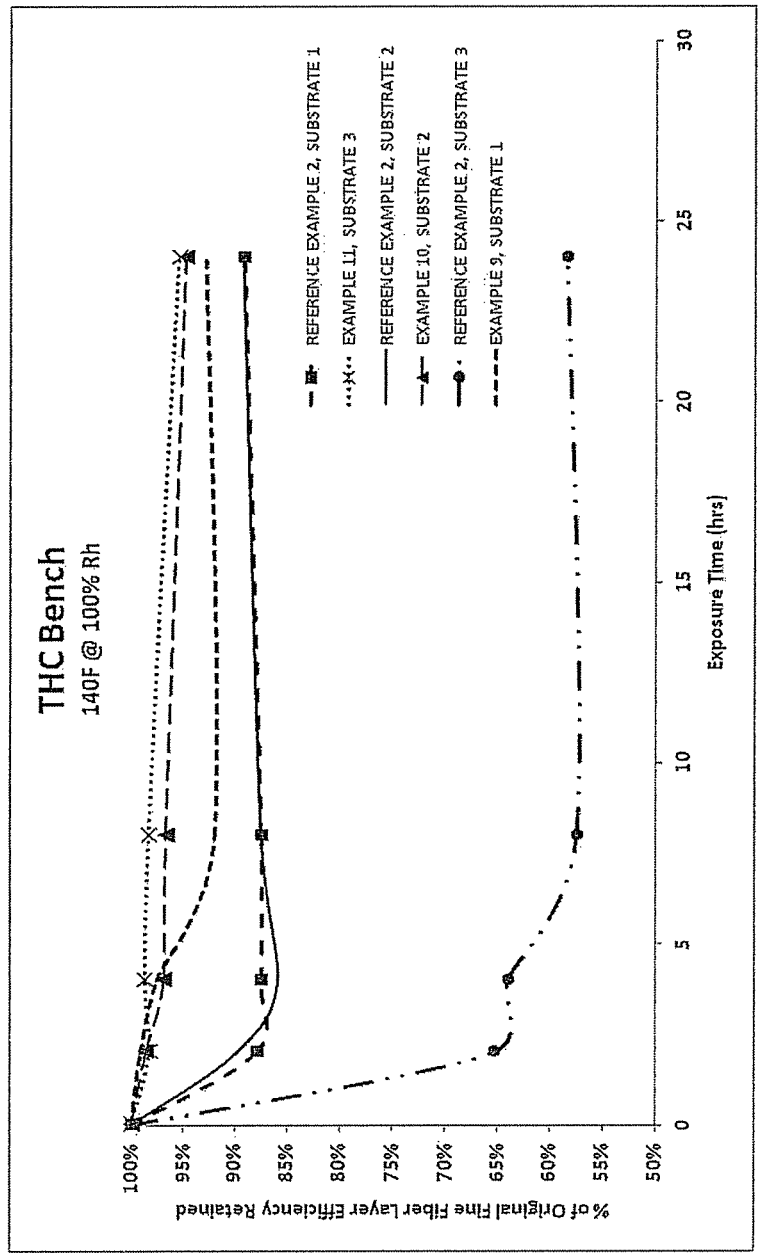
Figure 6:
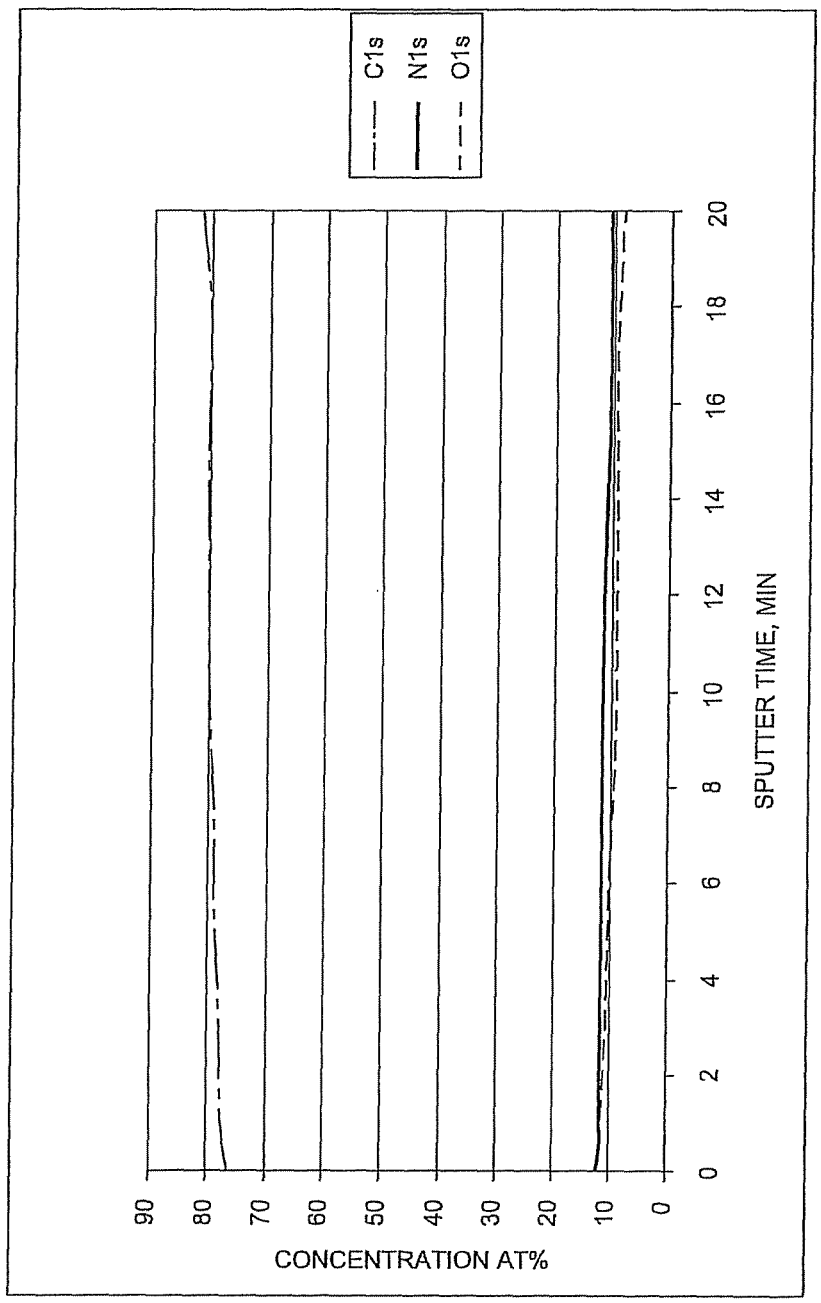
Figure 7:
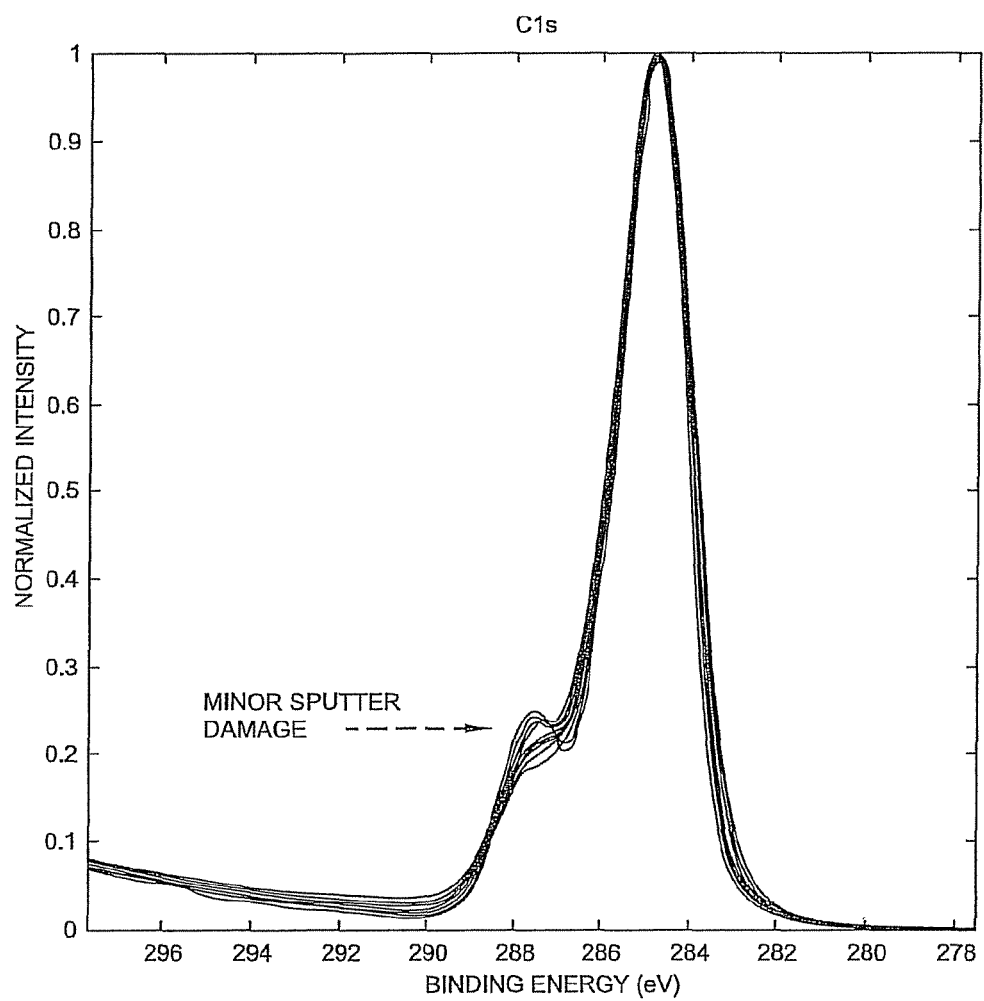
Figure 8:
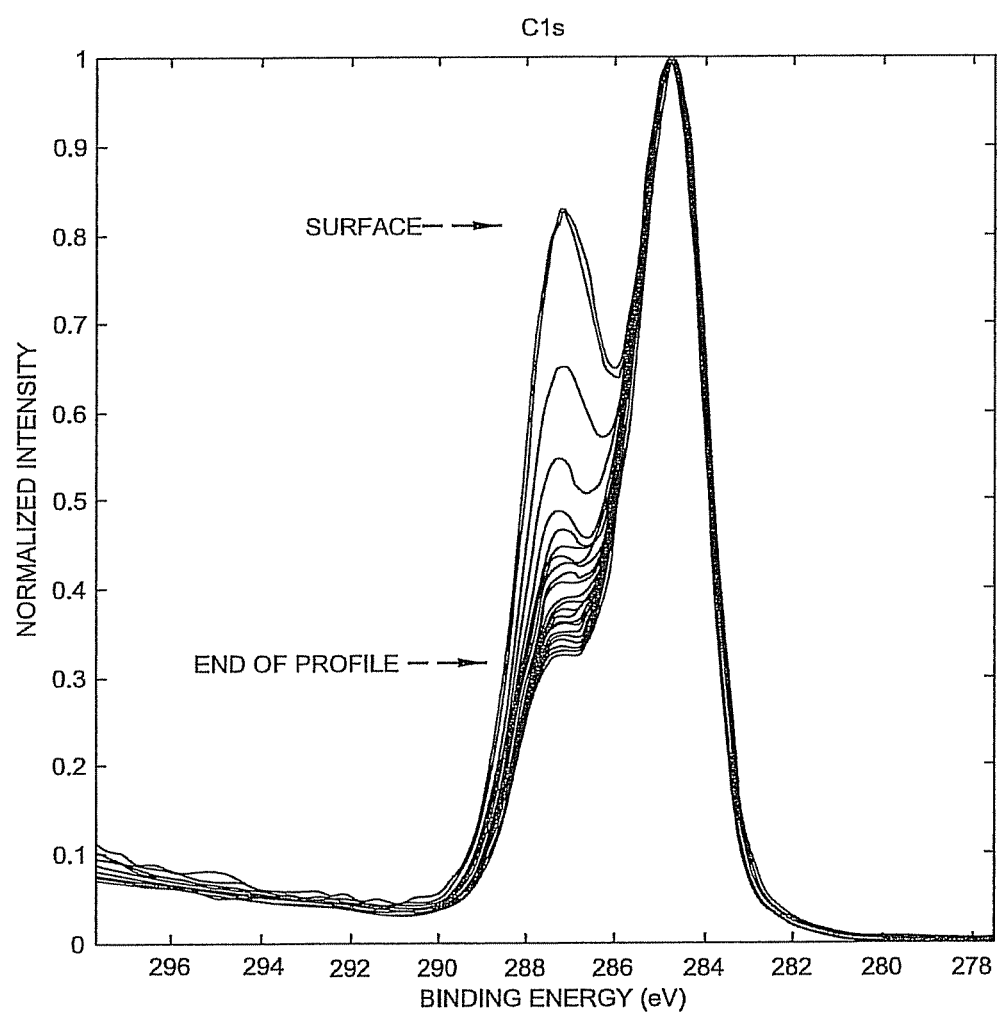
Figure 10:
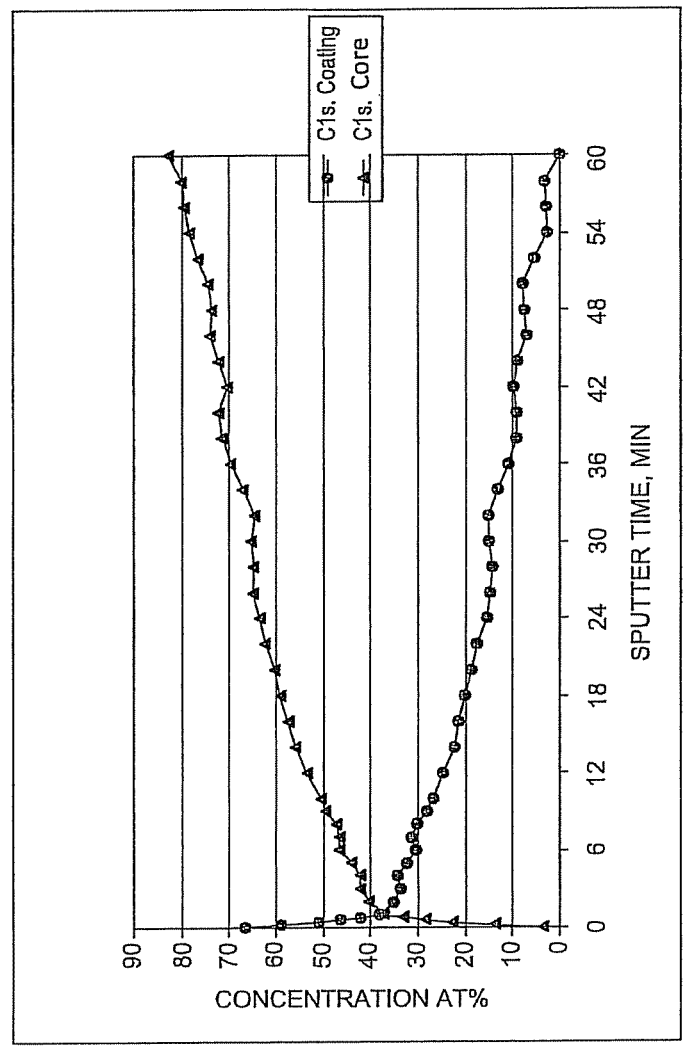

FIG. 5 graphically represents the fine fiber layer efficiency retained as a function of exposure time in a temperature-humidity chamber (THC) for the fine fibers of Examples 9-11 (melamine-formaldehyde:nylon weight ratio of 1:1) compared to Reference Examples 1 and 2.

FIGS. 6-10 display surface analysis results of certain fine fibers of the disclosure.

FIGS. 11A and 11B are representations of a cross-section of exemplary fine fibers of the disclosure showing, respectively, a three-phase and a two-phase structure.

Figure 12:
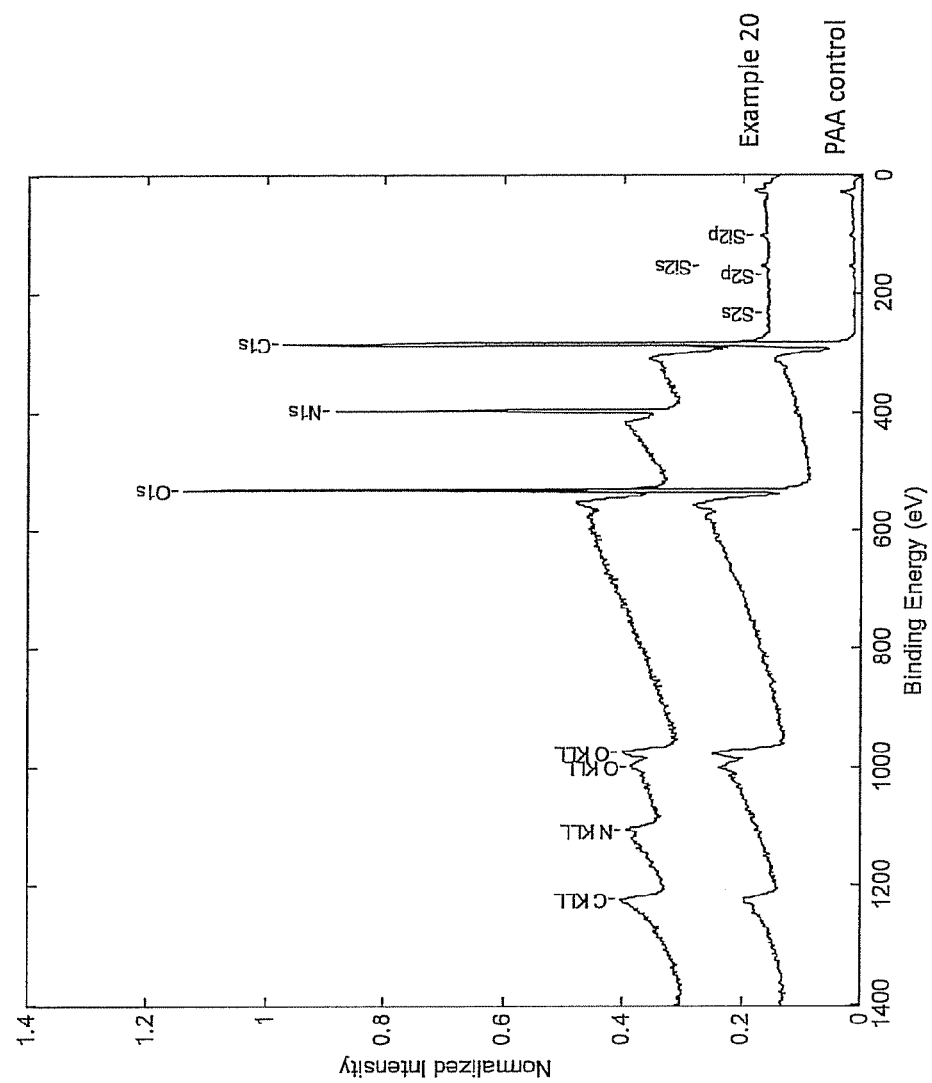
Figure 13:
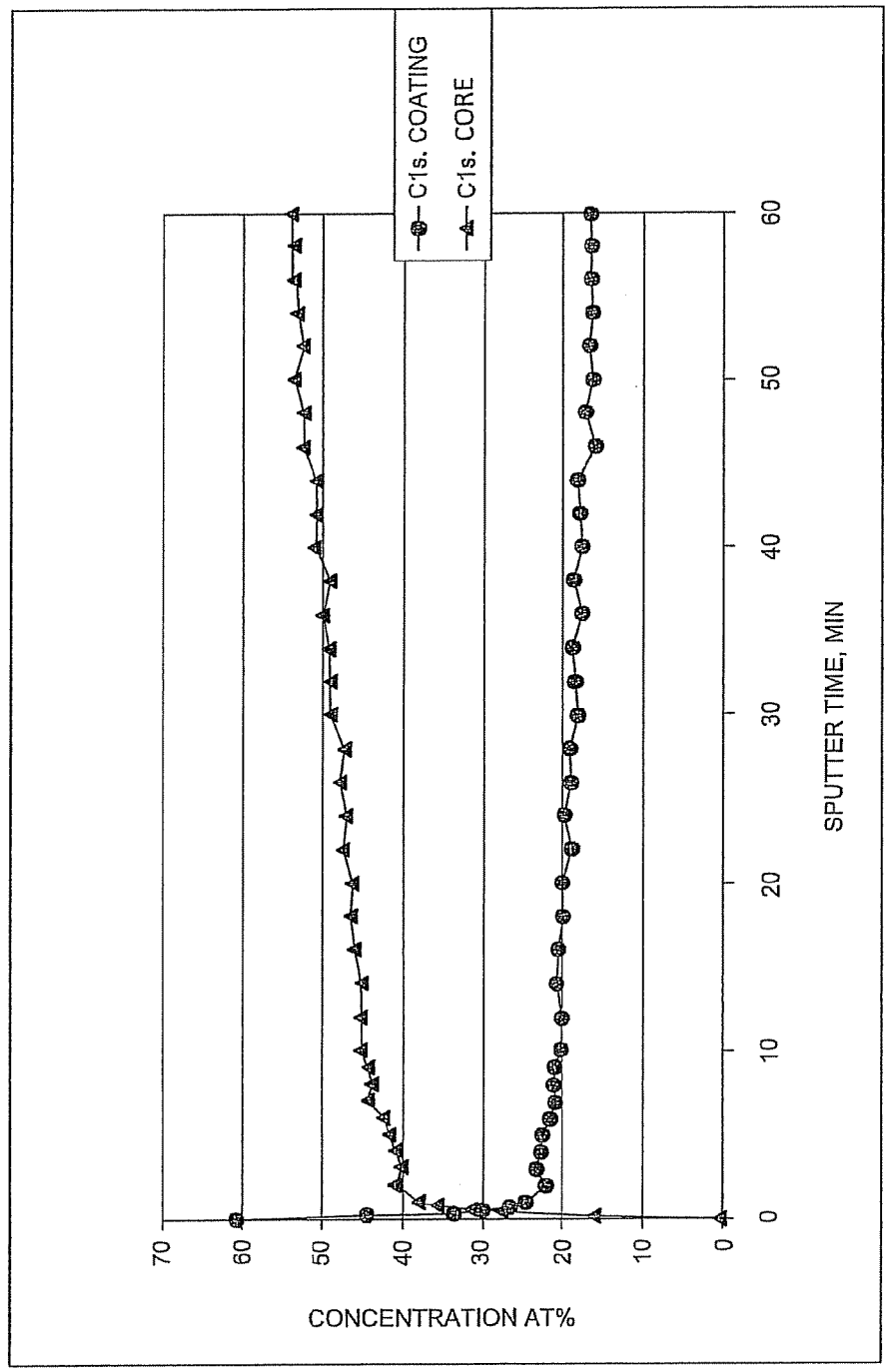
Figure 14:
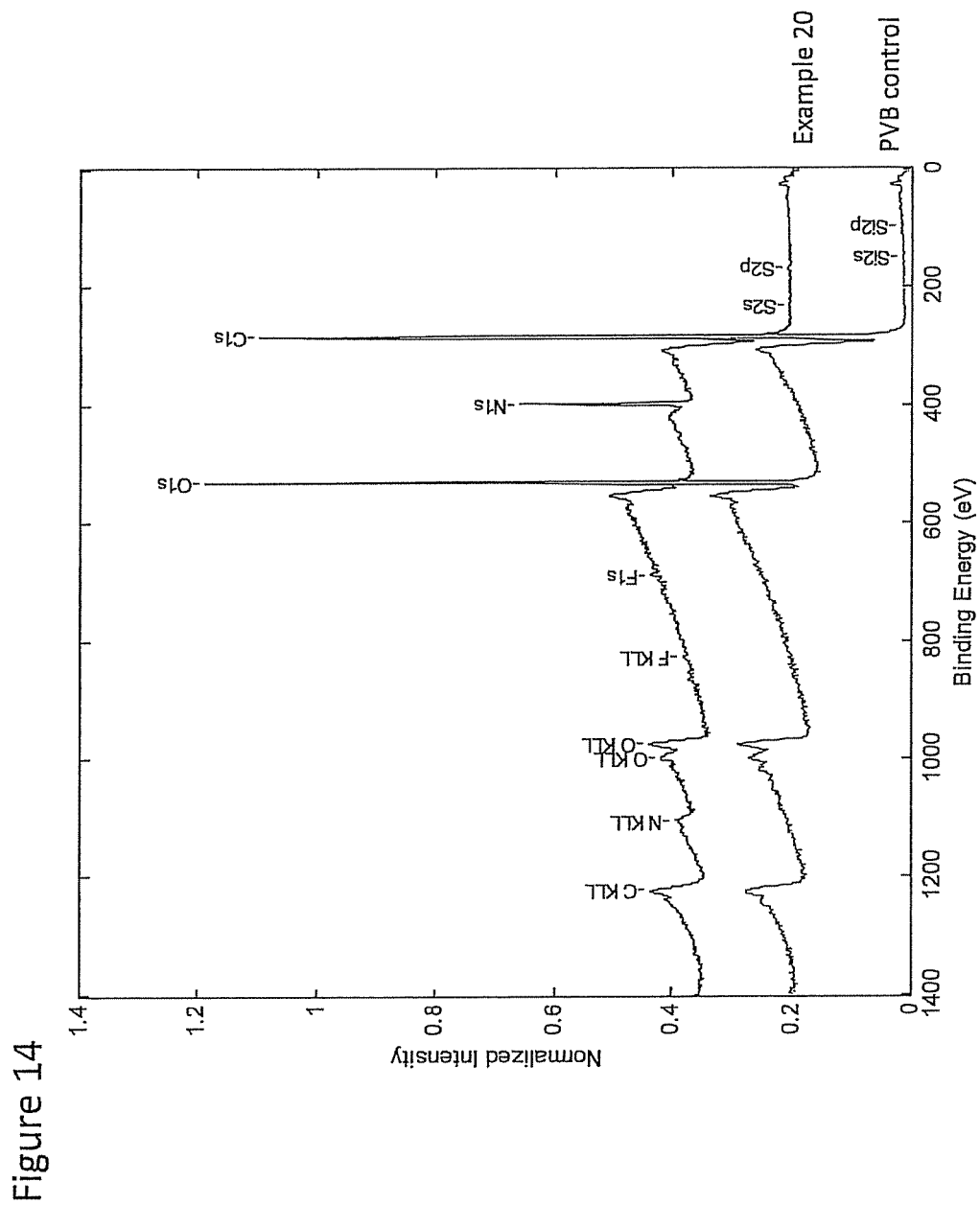

FIGS. 12-14 display surface analysis results of certain fine fibers of the disclosure.

Figure 15:
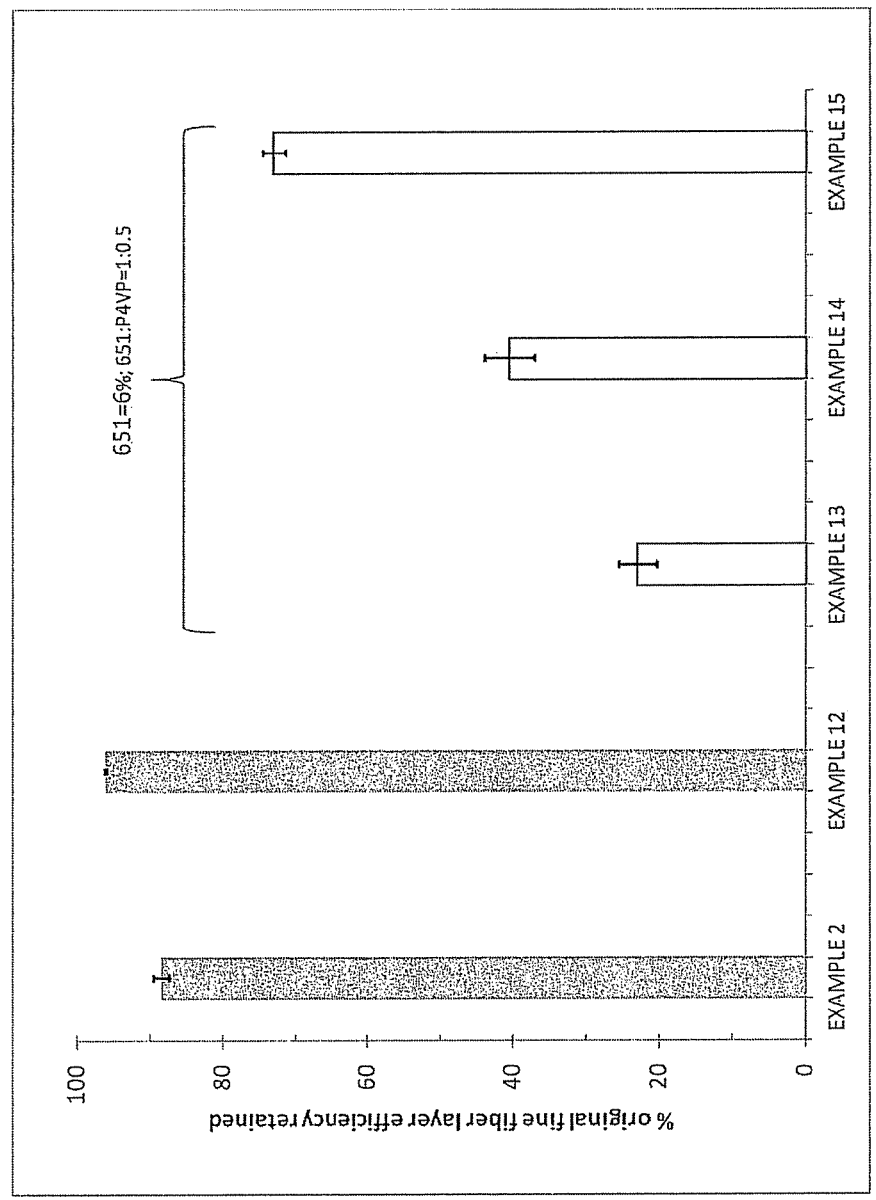

FIG. 15 shows the fine fiber layer efficiency retained for the fine fibers of Examples 2 and 13-15.

Figure 16:
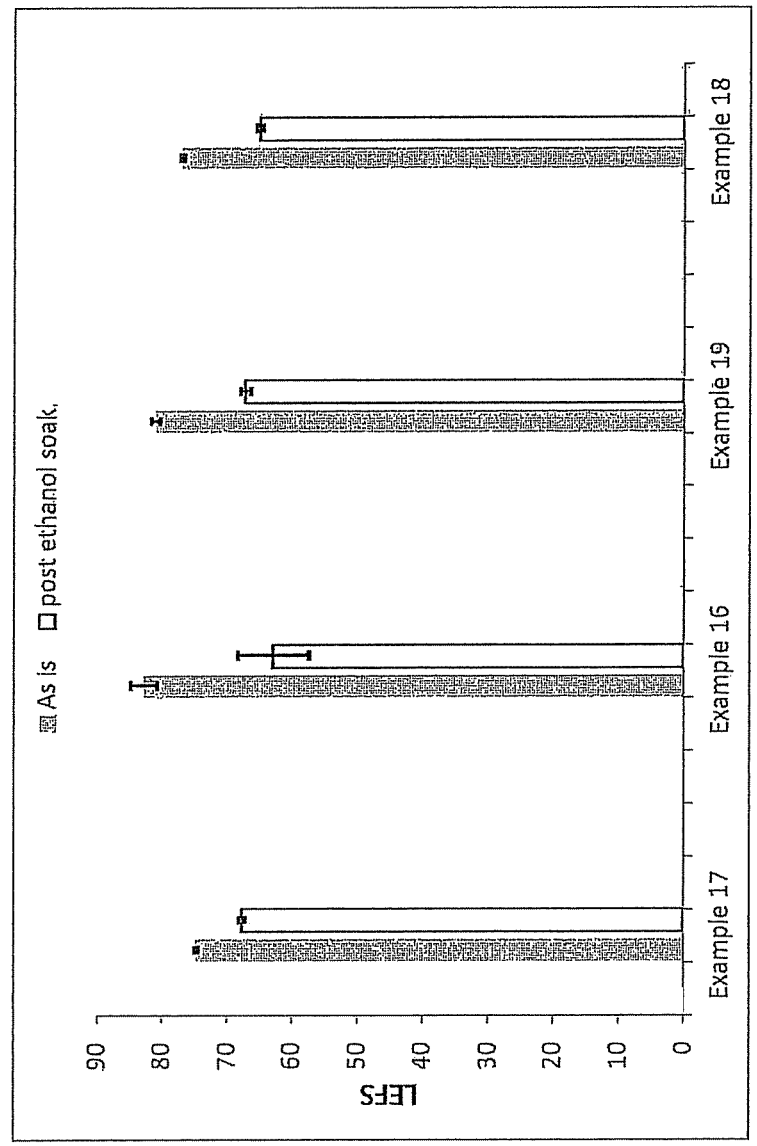

FIG. 16 graphically shows the filtration efficiency (LEFS) for the fine fibers of Examples 16-19.

DETAILED DESCRIPTION OF ILLUSTRATIVE EMBODIMENTS

Polymer webs have been made by electrospinning, melt spinning, extrusion melt spinning, air laid processing or wet laid processing. The filtration efficiency of such filters is characteristic of the filtration media and is related to the fraction of the particulate removed from the mobile fluid stream. Efficiency is typically measured by a set test protocol, an example of which is defined in the patents listed below. Fine fiber technologies that contemplate polymeric materials mixed or blended with a variety of other substances is disclosed in Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; Chung et al., U.S. Patent Publication No. 2003/0106294; Barris et al., U.S. Pat. No. 6,800,117; and Gillingham et al., U.S. Pat. No. 6,673,136. Additionally, in Ferrer et al., U.S. Pat. No. 7,641,055, a water-insoluble, high-strength polymer material is made by mixing or blending a polysulfone polymer with a polyvinyl pyrrolidone polymer resulting in a single phase polymer alloy used in electrospinning fine fiber materials. While the fine fiber materials discussed above have adequate performance for a number of filtration end uses, in applications with extremes of temperature ranges, where mechanical stability is required, improvements in fiber properties can always be made.

The present disclosure provides a simpler fiber-forming composition using an additive that performs the dual function of a surface-forming protective layer and crosslinker without resorting to mixtures of exotic, specialty polymers. Mixtures (i.e., blends of certain resinous aldehyde compositions with polymer materials can produce the desired protective layer structure. Significantly, the fine fibers of the present disclosure have a unique polymer composition using crosslinkers that result in a high degree of chemical/environmental resistance. Preferably and significantly, this unique polymer composition is suitable for electrospinning using a relatively safe solvent of alcohol-water mixture.

The fine fibers of the present disclosure are made by combining a fiber-forming polymer material and a resinous aldehyde composition that includes alkoxy groups, such as a reactive melamine-formaldehyde resin. Herein, "resin" or "resinous" refers to monomers, oligomers, and/or polymers, particularly of a nature that can migrate to the surface of a fine fiber during fiber formation. Herein, the term "resinous aldehyde composition" refers to the starting material as well as the material in the final fibers. It will be understood that in the final fibers, at least a portion of the resinous aldehyde composition will be involved in crosslinking the polymer and optionally can be involved in self-crosslinking.

The fiber-forming polymer material also includes reactive groups. In this context, "reactive" means that the polymer includes one or more functional groups (e.g., active hydrogen groups) capable of being crosslinked by the alkoxy groups of the resinous aldehyde composition used in making the fine fibers.

These components can be combined in solution or melt form. In certain embodiments, the fine fibers are electrospun from a solution or dispersion. Thus, the polymer materials and resinous aldehyde (e.g., melamine-aldehyde) compositions are dispersible or soluble in at least one common solvent or solvent blend suitable for electrospinning.

Referring to FIGS. 11A and 11B, as the fiber 100/102 forms, the resinous aldehyde composition preferably forms at least one exterior concentric (coaxial) layer (i.e., phase), such as a second coating phase 22 (FIG. 11B) comprising predominantly the resinous aldehyde composition (e.g., melamine-aldehyde composition), or two exterior concentric layers (i.e., phases) such as a second coating phase 20 (FIG. 11A) comprising a mixture of the polymer material and a resinous aldehyde composition, and a third exterior phase (outermost phase) 30 (FIG. 11A) comprising predominantly the resinous aldehyde composition. That is, the resinous aldehyde composition can migrate to the surface to form a two-phase fiber (FIG. 11B) or a three-phase fiber (FIG. 11A), in which the core 10 (FIG. 11A) or 12 (FIG. 11B) comprises primarily the polymer material (e.g., nylon). Generally, the more resinous aldehyde content relative to polymer, the greater the tendency to form a three-phase fiber.

Preferably, the fine fiber of the present disclosure is prepared from a resinous aldehyde composition comprising alkoxy groups and a polymer comprising active hydrogen groups, wherein the molar ratio of resinous aldehyde composition to polymer is such that the molar ratio of alkoxy groups of the resinous aldehyde composition to active hydrogen groups of the polymer is greater than 10:100 (more preferably, greater than 20:100, and even more preferably, greater than 40:100). Preferably, the molar ratio of resinous aldehyde composition to polymer is such that the molar ratio of alkoxy groups in the resinous aldehyde composition to active hydrogen groups in the polymer is no greater than 300:100 (more preferably, no greater than 250:100, and even more preferably, no greater than 210:100).

In certain embodiments, using a weight ratio of resinous aldehyde composition to polymer of at least (preferably, greater than) 20:100 (20 parts by weight resinous aldehyde composition per 100 parts by weight of the polymer) results in a useful exterior phase including the resinous aldehyde composition surrounding the core polymer. The exterior coating layer of predominantly resinous aldehyde composition (e.g., melamine-formaldehyde) provides improved properties, such as humidity resistance, to the fine fibers and fine fiber layers of the disclosure, relative to commercially available fibers and fiber layers. In this context, "predominantly" means the referenced material is present in a particular region (e.g., coating, layer, or phase) in a major amount (i.e., greater than 50% by weight) of the material in that region.

Suitable resinous aldehyde compositions include two or more alkoxy groups per molecule that are capable of crosslinking a polymer used in making the fine fibers as described herein. Exemplary resinous aldehyde compositions are synthetic resins made by treating various aldehydes with a reactant under condensation reaction conditions. Useful such reactants include phenol, urea, aniline, benzoguanamine, glycoluril, and melamine. Useful resinous aldehyde compositions include aldehyde-based agents that can be used in crosslinking reactions. The resinous aldehyde compositions are typically nonvolatile. The resinous aldehyde compositions (when combined with polymers such as nylon, as described in greater detail below) should also be soluble in a solvent chosen for the polymer material for processing, such as in electrospinning. Resinous aldehyde compositions useful as crosslinking agents include a condensation product of urea and an aldehyde, a condensation product of phenol and an aldehyde, or a condensation product of melamine and an aldehyde. One useful class of crosslinking resins includes resins based on nitrogen compounds such as melamine, urea, benzoguanamine, glycoluril, and other similar resins manufactured by reacting an aldehyde with a nitrogen compound. Such amine-based crosslinking resins are soluble in process solvents and possess reactivity with a variety of polymer species.

Useful resinous aldehyde compositions (e.g., melamine-aldehyde compositions) include crosslinking agents, and optionally other nonreactive room-temperature-stable resin components, that can be combined in solution or melt form with a variety of polymer materials. Melamine forms resinous compositions with a variety of other co-reactants.

Useful melamine-aldehyde compositions include melamine-aldehyde products generally formed by the reaction between melamine and an aldehyde compound. Useful aldehyde compounds include $C_{1-6}$ alkanals including formaldehyde, acetaldehyde, butyraldehyde, isobutyraldehyde, and the like. Mixtures of such aldehydes can be used if desired. The melamine-aldehyde resins, and other suitable resinous aldehyde compositions, include components having at least two alkoxy groups per molecule. Typical partially and fully reacted melamine-aldehydes have from 3 to 6, or from 4 to 6, alkoxy groups per molecule.

In certain embodiments, the resinous aldehyde composition comprises a condensation product of urea and an aldehyde, a condensation product of phenol and an aldehyde, a condensation product of melamine and an aldehyde, or a mixture thereof. In certain embodiments, the resinous aldehyde composition comprises a condensation product of benzoguanamine and an aldehyde, a condensation product of glycouril and an aldehyde, or a mixture thereof.

Useful resinous aldehyde compositions (e.g., melamine-aldehyde compositions) include compounds and mixtures thereof including: highly methylated melamine; partially methylated melamine; methylated high imino melamine; highly alkylated mixed ether melamine; highly alkylated carboxylated, high imino mixed ether melamine; highly n-butylated melamine; n-butylated high imino and partially n-butylated melamine; partially iso-butylated melamine; partially n-butylated urea; partially iso-butylated urea; glycoluril; highly alkylated mixed ether melamine-formaldehyde; highly alkylated mixed ether carboxylated melamine resin; hexa butoxy methyl melamine; butoxy methyl melamine; highly alkylated mixed ether melamine; methoxymethyl methylol melamine, highly methylated melamine resins; melamine-formaldehyde resin co-etherified with methanol and n-butoxy ethanol/n-butanol blend; melamine-formaldehyde resin co-etherified with methanol and n-butanol in n-butanol; butylated melamine-formaldehyde resin dissolved in a blend of n-butanol and butyl glycol; hexa butoxy methyl melamine; partially n-butylated melamine; high solids, highly methylated melamine resins; various resinous aldehyde compositions sold under the trade names CYMEL available from Cytec Industries of West Paterson, N.J., wherein such compositions include, for example, CYMEL 301, CYMEL 303 LF, CYMEL 350, CYMEL 3745, CYMEL MM-100, CYMEL 370, CYMEL 373, CYMEL 3749, CYMEL 323, CYMEL 325, CYMEL 327, CYMEL 328, CYMEL 385, CYMEL 481, CYMEL 1116, CYMEL 1130, CYMEL 1133, CYMEL 1135, CYMEL 1161, CYMEL 1168, CYMEL 1125, CYMEL 1141, CYMEL 202, CYMEL 203, CYMEL 254, CYMEL 1156, CYMEL 1158, CYMEL 9370, CYMEL MB-98, CYMEL MB-11-B, CYMEL MB-14-B, CYMEL 615, CYMEL 651, CYMEL 683, CYMEL 688, CYMEL MI-12-I, CYMEL MI-97-IX, CYMEL UM-15, CYMEL U-80, CYMEL UB-24-BX, CYMEL UB-25-BE, CYMEL UB-26-BX, CYMEL UB-30-B, CYMEL UB-90-BX, CYMEL U-227-8, CYMEL U-610, CYMEL U-640, CYMEL U-646, CYMEL U-662, CYMEL U-663, CYMEL U-665, CYMEL UI-19-I, CYMEL UI-19-IE, CYMEL UI-20-E, CYMEL UI-38-I, CYMEL 1123, CYMEL 659, CYMEL 1172, CYMEL 1170, and the like; and various resinous aldehyde compositions sold under the trade name LUWIPAL and available from the BASF AG of Ludwigshafen, Germany, wherein such compositions include, for example, LUWIPAL LR 8955, LUWIPAL LR 8968, and LUWIPAL LR 8984. Such resins are also available from INEOS Melamines Inc., and sold under the trade names RESIMENE (e.g., RESIMENE HM 2608), MAPRENAL, and MADURIT. Various combinations of resinous aldehyde compositions can be used if desired.

In many preferred embodiments, a melamine-formaldehyde resin (sometimes referred to herein as simply a "melamine composition" or "melamine resin") is used. Reference to melamine-formaldehyde resins means a melamine-based resin that has two or more (at least two) alkoxy functional groups (methoxy, ethoxy, propoxy, butoxy, etc.) per melamine molecule. Besides the alkoxy functional groups, the melamine-formaldehyde resins may have NH, hydroxyl, or carboxylic acid functional groups. Uncrosslinked melamine-formaldehyde is a thermosetting plastic (thermoset) additive used for crosslinking polymers that strengthens the crosslinked polymer as it is heated. Once set, it cannot be remolded or set to form a different shape. Crosslinked melamine-formaldehyde plastics retain their strength and shape, unlike other types of thermoplastics that soften with heat and harden when cooled (such as acetate, acrylic, and nylon). Crosslinked melamine-formaldehyde is stain-resistant and resistant to strong solvents and water. Depending on the functional groups in the melamine-formaldehyde resins, uncrosslinked resins can be both water soluble and water insoluble, or soluble in organic solvents such as alcohols, hydrocarbons (toluene, xylene, etc.) or others, or a mixture of these solvents.

Melamine-formaldehyde resins are made from the reaction of formaldehyde with melamine. Melamine (chemical formula $C_3H_6N_6$) and formaldehyde (chemical formula $CH_2O$) have the following structures:

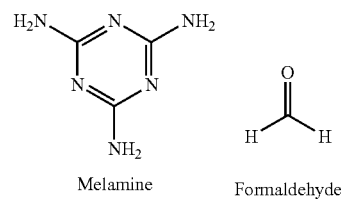

Melamine    Formaldehyde wherein melamine is 1,3,5-triazine-2,4,6-triamine; or 2,4,6-triamino-s-triazine; or cyanuro triamide. Representative structures for the melamine-formaldehyde resin are shown in structure I or II:

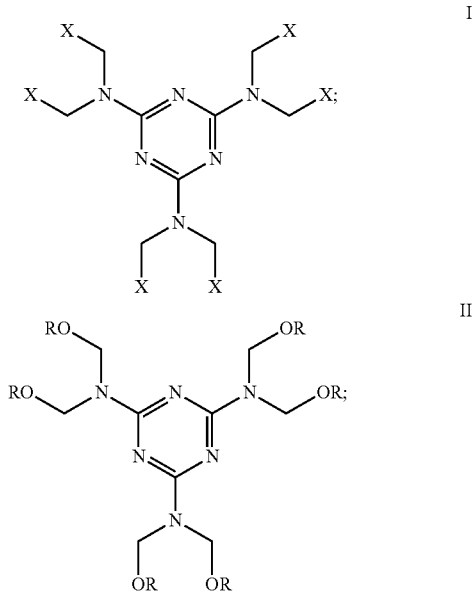

wherein in compound I, X is H or alkoxy or hydroxyl and at least two X groups are alkoxy. Preferably, if the compound has two or three alkoxy groups, the alkoxy groups are not on the same nitrogen substituent. The melamine resin compound I needs at a minimum two reactive or crosslinkable alkoxy groups. Representative compound II is a fully reacted compound referred to as a hexa(alkoxymethyl) melamine type resin, wherein R is H or alkyl (methyl, ethyl, butyl, etc.) (such that OR is an alkoxy group (methoxy, ethoxy, butoxy, etc.)).

Melamine resins are part of a larger class of amino resins. They are used as bonding agents in plywood and particle board and wrinkle-resistance agents in textiles. They are also molded for electrical devices and various commercial and home applications. They are also used as crosslinkers in paper towels to increase water resistance. When we refer to melamine-formaldehyde resins we refer to uncrosslinked melamine resins. It is sold under various trade names, including CYMEL, LUWIPAL, RESIMENE, MAPRENAL, etc.

An exemplary such melamine resin is hexa(methoxymethyl)melamine (HMMM) (e.g., structure II above wherein R is methyl). As reaction partners for HMMM, polymers having active hydrogen groups, predominantly amide, hydroxyl, carboxyl or anhydride functional groups, have been used for making films.

If desired, and depending on the resinous aldehyde composition, for example, the crosslinking reaction described herein may need a strong acid catalyst such as a sulfonic acid, such as para-toluene sulfonic acid. In certain embodiments, a catalyst such as an acid catalyst is preferably used in an amount of at least 4 wt-%, based on polymer solids, to enhance crosslinking speed. Typically, no more than 10 wt-% catalyst, such as an acid catalyst, is used in the crosslinking reaction of the present disclosure.

If desired, fine fibers formed from the crosslinking reaction between a resinous aldehyde composition and a polymer material, as described herein, can be enhanced, e.g., with respect to speed and extent of crosslinking, by exposing the fine fibers to thermal treatment. Such thermal treatment typically includes a temperature of at least 80° C., at least 100° C., or at least 120° C., and typically no greater than 150° C., for typically at least 5 seconds, and typically no greater than 10 minutes.

In the fibers of the disclosure, the resinous aldehyde composition of the disclosure is combined with a polymer material that comprises a polymer or polymer mixture or blend. The polymer or polymer mixture or blend is selected such that it can be combined with the resinous aldehyde composition in a solution or dispersion or in the melt. The combination of polymer material and resinous aldehyde composition, in certain embodiments, should be substantially stable in the melt or in solution or dispersion form for sufficient time such that the fiber can be formed.

The polymer or polymer mixture or blend should include at least one fiber-forming polymer that includes one or more active hydrogen groups capable of being crosslinked by the resinous aldehyde composition. Preferred such polymer materials include one or more active hydrogen groups capable of reacting with and crosslinking to the resinous aldehyde compositions. Active hydrogen groups include, but are not limited to, thiol (—SH), hydroxyl (—OH), carboxylate (—CO$_2$H), amido (—C(O)—NH— or —C(O)—NH$_2$), amino (—NH$_2$), or imino (—NH—), and anhydride (—COO)$_2$R groups (upon hydrolysis). These groups can be found in pendent polymer groups or in the polymer backbone.

Polymer materials suitable for use in the polymeric compositions of the disclosure include both addition polymer and condensation polymer materials with active hydrogens. Suitable examples include poly(meth)acrylic acids, polyamides, cellulose ethers and esters, poly(maleic anhydride), polyamines such as chitosan and mixtures, blends, alloys, and block, graft, or random copolymers thereof. Such copolymers can include one or more other moieties in addition to those listed in the previous sentence. Preferred materials that fall within these generic classes include poly(vinyl alcohol) in various degrees of hydrolysis (e.g., 87% to 99.5%) in crosslinked and non-crosslinked forms. Preferred addition polymers tend to be glassy, that is, having a $T_g$ (glass transition temperature) greater than room temperature. Additionally, polymer materials that have low crystallinity, such as poly(vinyl alcohol) materials, are also useful as the polymer materials of the disclosure.

Other preferred examples of useful polymer materials include cellulose derivatives selected from the group consisting of ethyl cellulose, hydroxyl ethyl cellulose, cellulose acetate, cellulose acetate butyrate, cellulose acetate propionate, cellulose acetate phthalate, and mixtures thereof; poly(meth)acrylic acid homopolymers and copolymers, including for example, styrene-(meth)acrylic acid copolymers and ethylene-(meth)acrylic acid copolymers; polyvinyl alcohol homopolymers or copolymers, including for example, a polyvinyl butyral and an ethylene co-vinyl alcohol copolymer; poly(maleic anhydride) homopolymers or copolymers, including for example, a styrene-maleic anhydride copolymer; and polyurethanes. Herein, a poly (meth)acrylic acid refers to poly(acrylic acid) and poly (methacrylic acid) polymers.

Many types of polyamides are also useful as the polymer materials in the fibers of the disclosure. One useful class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of ε-caprolactam in the presence of a small amount of water. This reaction forms a nylon-6 (made from a cyclic lactam, also known as ε-aminocaproic acid) that is a linear polyamide. Further, nylon copolymers are also contemplated. Exemplary nylon materials include nylon-6, nylon-6,6, nylon-6,10, mixtures or copolymers thereof.

Copolymers can be made by combining various diamine compounds, various diacid compounds and various cyclic lactam structures in a reaction mixture and then forming the nylon with randomly positioned monomeric materials in a polyamide structure. For example, a nylon-6,6-6,10 material is a nylon manufactured from hexamethylene diamine and a $C_6$ and a $C_{10}$ blend of diacids. A nylon-6-6,6-6,10 is a nylon manufactured by copolymerization of ε-aminocaproic acid, hexamethylene diamine and a blend of a $C_6$ and a $C_{10}$ diacid material. Herein, the term "copolymer" includes polymers made from two or more different monomers and include terpolymers, etc.

Block copolymers are also useful as the polymer materials in the fibers of the disclosure. With such copolymers, where fibers will be electrospun, the choice of solvent or solvent blend is important. The selected solvent or solvent blend is selected such that both blocks are soluble in the solvent. Examples of useful block copolymers include PEBAX ε-caprolactam-b-ethylene oxide, available from Arkema Inc. of Philadelphia, Pa.; and polyurethanes of ethylene oxide and isocyanates.

Addition polymers like polyvinyl alcohol, and amorphous addition polymers such as poly(acrylonitrile) copolymers with acrylic acid are also useful. They can be solution spun with relative ease because they are soluble or dispersible in a variety of solvents and solvent blends at low pressures and temperatures. A poly(vinyl alcohol) having a hydrolysis degree of, for example, from 87 to 99.9+% can be used as the polymer material in the fibers of the disclosure.

Preferred polymers within this embodiment include a polyamides (particularly nylon), polyester amides, a polyvinyl alcohol, an ethylene-co-vinyl alcohol polymer, a polyvinyl butyral, and poly(maleic anhydride). Preferred active hydrogen groups include hydroxyl, amino, and amido groups. Various combinations of polymer materials can be used if desired.

Optionally, in addition to the polymers with reactive hydrogen groups, the polymer material used in the fibers of the disclosure can include one or more nonreactive polymers. In this context, "nonreactive" is defined as being unable to crosslink with melamine-formaldehyde resins or other resinous aldehyde composition used. For example, polymer materials such as many polyolefins, polyvinyl chloride and other such materials may be used, wherein such polymers have no groups that can crosslink with the resinous aldehyde composition. Other nonreactive polymers include polyacetals, polyesters, polyalkylene sulfides, polyarylene oxides, polysulfones, modified (e.g., polyether) polysulfone polymers, poly(vinylpyridine) such as poly(4-vinylpyridine), and the like. Preferred materials that fall within these generic classes include polyethylene, polypropylene, poly(vinyl chloride), poly(methylmethacrylate), (and other acrylic resins), polystyrene, and copolymers thereof (including ABA type block copolymers), poly(vinylidene fluoride), poly(vinylidene chloride), mixtures, blends, or alloys. Examples of useful block copolymers include ABA-type copolymers (e.g, styrene-EP-styrene) (wherein "EP" refers to ethylene-propylene) or AB (e.g., styrene-EP) polymers, KRATON styrene-b-butadiene and styrene-b-hydrogenated butadiene(ethylene propylene), available from Kraton Polymers U.S. LLC of Houston, Tex.; and SYMPATEX polyester-b-ethylene oxide, available from SympaTex Technologies Inc. of Hampton, N.H. Various combinations of nonreactive polymers can be used if desired.

If desired, a nonreactive polymer can be used in an amount that does not adversely impact the positive effects of the crosslinking that occurs upon use of a polymer having active hydrogens.

Addition nonreactive polymers like poly(vinylidene fluoride), syndiotactic polystyrene, copolymers of vinylidene fluoride and hexafluoropropylene, polyvinyl acetate, amorphous addition polymers such as polystyrene, poly(vinyl chloride) and its various copolymers, and poly(methyl methacrylate) and its various copolymers can be solution spun with relative ease because they are soluble or dispersible in a variety of solvents and solvent blends at low pressures and temperatures. However, highly crystalline polymers like polyethylene and polypropylene typically require high temperature, high pressure solvents or solvent blends if they are to be solution spun. Therefore, solution spinning of the polyethylene and polypropylene is very difficult.

One aspect of the disclosure is the utility of such fine fiber materials as they are formed into a filter structure such as filter media. In such a structure, the fine fiber materials of the disclosure are formed on and adhered to a filter substrate (i.e., filtration substrate). Natural fiber and synthetic fiber substrates can be used as the filter substrate. Examples include spunbonded or melt-blown supports or fabrics, wovens and nonwovens of synthetic fibers, cellulosic materials, and glass fibers. Plastic screen-like materials both extruded and hole punched, are other examples of filter substrates, as are ultra-filtration (UF) and micro-filtration (MF) membranes of organic polymers. Examples of synthetic nonwovens include polyester nonwovens, polyolefin (e.g., polypropylene) nonwovens, or blended nonwovens thereof. Sheet-like substrates (e.g., cellulosic or synthetic nonwoven webs) are the typical form of the filter substrates. The shape and structure of the filter material, however, is typically selected by the design engineer and depends on the particular filtration application.

A filter media construction according to the present disclosure can include a layer of permeable coarse fibrous material (i.e., media or substrate) having a first surface. A first layer of fine fiber media is preferably disposed on the first surface of the layer of permeable coarse fibrous media.

Preferably, the layer of permeable coarse fibrous material comprises fibers having an average diameter of at least 5 microns, and more preferably at least 12 microns, and even more preferably at least 14 microns. Preferably, the coarse fibers have an average diameter of no greater than 50 microns.

Also, preferably, the permeable coarse fibrous material comprises a media having a basis weight of no greater than 260 grams/meter$^2$ (g/m$^2$), and more preferably no greater than 150 g/m$^2$. Preferably, the permeable coarse fibrous material comprises a media having a basis weight of at least 0.5 g/m$^2$, and more preferably at least 8 g/m$^2$. Preferably, the first layer of permeable coarse fibrous media is at least 0.0005 inch (12 microns) thick, and more preferably at least 0.001 inch thick. Preferably, the first layer of permeable coarse fibrous media is no greater than 0.030 inch thick. Typically and preferably, the first layer of permeable coarse fibrous media is 0.001 inch to 0.030 inch (25-800 microns) thick. Preferably, the first layer of permeable coarse fibrous media has a Frazier permeability (differential pressure set at 0.5 inch of water) of at least 2 meters/minute (m/min). Preferably, the first layer of permeable coarse fibrous media has a Frazier permeability (differential pressure set at 0.5 inch of water) of no greater than 900 m/min.

In preferred arrangements, the first layer of permeable coarse fibrous material comprises a material which, if evaluated separately from a remainder of the construction by the Frazier permeability test, would exhibit a permeability of at least 1 m/min, and preferably at least 2 m/min. In preferred arrangements, the first layer of permeable coarse fibrous material comprises a material which, if evaluated separately from a remainder of the construction by the Frazier permeability test, would exhibit a permeability of no greater than 900 m/min, and typically and preferably 2-900 m/min. Herein, when reference is made to efficiency, unless otherwise specified, reference is meant to efficiency when measured according to ASTM-1215-89, with 0.78 micron ($\mu$) monodisperse polystyrene spherical particles, at 20 fpm (feet per minute, 6.1 m/min) as described herein.

Fine fibers of the disclosure can be made using a variety of techniques including electrostatic spinning, wet spinning, dry spinning, melt spinning, extrusion spinning, direct spinning, gel spinning, etc.

Herein, a "fine" fiber has an average fiber diameter of no greater than 10 microns. Typically, this means that a sample of a plurality of fibers of the present disclosure has an average fiber diameter of no greater than 10 microns. Preferably, such fibers have an average diameter of no greater than 5 microns, more preferably no greater than 2 microns, even more preferably no greater than 1 micron, and even more preferably no greater than 0.5 micron. Preferably, such fibers have an average diameter of at least 0.005 micron, more preferably at least 0.01 micron, and even more preferably at least 0.05 micron.

The fine fibers are collected on a support layer during, for example, electrostatic or melt spinning formation, and are often heat treated after fiber making. Preferably, the layer of fine fiber material is disposed on a first surface of a layer of permeable coarse fibrous media (i.e., support layer) as a layer of fiber. Also, preferably the first layer of fine fiber material disposed on the first surface of the first layer of permeable coarse fibrous material has an overall thickness that is no greater than 50 microns, more preferably no greater than 30 microns, even more preferably no more than 20 microns, and most preferably no greater than 10 microns. Typically and preferably, the thickness of the fine fiber layer is within a thickness of 1-20 times (often 1-8 times, and more preferably no more than 5 times) the fine fiber average diameter used to make the layer. In certain embodiments, the fine fiber layer has a thickness of at least 0.05$\mu$.

In a fiber spinning process for making fine fibers of the disclosure, the polymer being spun is typically converted into a fluid state (e.g., by dissolution in solvent or melting).

The fluid polymer is then forced through the spinneret, where the polymer cools to a rubbery state, and then a solidified state. The aldehyde composition can migrate to the surface as the fluid polymer transitions to a solid state. Wet spinning is typically used for polymers that need to be dissolved in a solvent to be spun. The spinneret is submerged in a chemical bath that causes the fiber to precipitate, and then solidify, as it emerges. The process gets its name from this "wet" bath. Acrylic, rayon, aramid, modacrylic, and spandex are produced via this process. Dry spinning is also used for polymers that are dissolved in solvent. It differs in that the solidification is achieved through evaporation of the solvent. This is usually achieved by a stream of air or inert gas. Because there is no precipitating liquid involved, the fiber does not need to be dried, and the solvent is more easily recovered. Melt spinning is used for polymers that can be melted. The polymer solidifies by cooling after being extruded from the spinneret.

In a typical process, pellets or granules of the solid polymer are fed into an extruder. The pellets are compressed, heated and melted by an extrusion screw, then fed to a spinning pump and into the spinneret. A direct spinning process avoids the stage of solid polymer pellets. The polymer melt is produced from the raw materials, and then from the polymer finisher directly pumped to the spinning mill. Direct spinning is mainly applied during production of polyester fibers and filaments and is dedicated to high production capacity (>100 tons/day). Gel spinning, also known as dry-wet spinning, is used to obtain high strength or other special properties in the fibers. The polymer is in a "gel" state, only partially liquid, which keeps the polymer chains somewhat bound together. These bonds produce strong inter-chain forces in the fiber, which increase its tensile strength. The polymer chains within the fibers also have a large degree of orientation, which increases strength. The fibers are first air dried, then cooled further in a liquid bath. Some high strength polyethylene and aramid fibers are produced via this process.

An alternative for making fine fibers of the disclosure is a melt-blowing process. Melt-blowing (MB) is a process for producing fibrous webs or articles directly from polymers or resins using high-velocity air or another appropriate force to attenuate the filaments. This process is unique because it is used almost exclusively to produce microfibers rather than fibers the size of normal textile fibers. MB microfibers generally have diameters in the range of 2 to 4 µm (micrometers or microns or µ), although they may be as small as 0.1 µm and as large as 10 to 15 µm. Differences between MB nonwoven fabrics and other nonwoven fabrics, such as degree of softness, cover or opacity, and porosity can generally be traced to differences in filament size. As soon as the molten polymer is extruded from the die holes, high velocity hot air streams (exiting from the top and bottom sides of the die nosepiece) attenuate the polymer streams to form microfibers. As the hot air stream containing the microfibers progresses toward the collector screen, it entrains a large amount of surrounding air (also called secondary air) that cools and solidifies the fibers. The solidified fibers subsequently get laid randomly onto the collecting screen, forming a self-bonded nonwoven web. The fibers are generally laid randomly (and also highly entangled) because of the turbulence in the air stream, but there is a small bias in the machine direction due to some directionality imparted by the moving collector. The collector speed and the collector distance from the die nosepiece can be varied to produce a variety of melt-blown webs. Usually, a vacuum is applied to the inside of the collector screen to withdraw the hot air and enhance the fiber laying process.

Any of the above-listed processes for making the fine fiber of the disclosure can be used to make the permeable course fibrous material for the filtration substrate. Spunbond techniques can also be used for making the permeable course fibrous material for the filtration substrate. Spunbond fabrics are produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. Polyethylene or random ethylene-propylene copolymers are used as low melting bonding sites. Spunbond products are employed in carpet backing, geotextiles, and disposable medical/hygiene products. Since the fabric production is combined with fiber production, the process is generally more economical than when using staple fiber to make nonwoven fabrics. The spinning process is similar to the production of continuous filament yarns and utilizes similar extruder conditions for a given polymer. Fibers are formed as the molten polymer exits the spinnerets and is quenched by cool air. The objective of the process is to produce a wide web and, therefore, many spinnerets are placed side by side to generate sufficient fibers across the total width. The grouping of spinnerets is often called a block or bank. In commercial production two or more blocks are used in tandem in order to increase the coverage of fibers.

In a spunbond process, before deposition on a moving belt or screen, the output of a spinneret usually consists of a hundred or more individual filaments which must be attenuated to orient molecular chains within the fibers to increase fiber strength and decrease extensibility. This is accomplished by rapidly stretching the plastic fibers immediately after exiting the spinneret. In practice the fibers are accelerated either mechanically or pneumatically. In most processes the fibers are pneumatically accelerated in multiple filament bundles; however, other arrangements have been described where a linearly aligned row or rows of individual filaments is pneumatically accelerated.

In a traditional textile spunbond process some orientation of fibers is achieved by winding the filaments at a rate of approximately 3,200 m/min to produce partially oriented yarns (POY). The POYs can be mechanically drawn in a separate step for enhancing strength. In spunbond production filament bundles are partially oriented by pneumatic acceleration speeds of 6,000 m/min or higher. Such high speeds result in partial orientation and high rates of web formation, particularly for lightweight structures (17 g/m$^2$). The formation of wide webs at high speeds is a highly productive operation.

For many applications, partial orientation of the course fibers of the filter substrate sufficiently increases strength and decreases extensibility to give a functional fabric (examples: diaper cover stock). However, some applications, such as primary carpet backing, require filaments with very high tensile strength and low degree of extension. For such application, the filaments are drawn over heated rolls with a typical draw ratio of 3.5:1. The filaments are then pneumatically accelerated onto a moving belt or screen. This process is slower, but gives stronger webs.

The spunbond web is formed by the pneumatic deposition of the filament bundles onto the moving belt. A pneumatic gun uses high-pressure air to move the filaments through a constricted area of lower pressure, but higher velocity as in a venturi tube. In order for the web to achieve maximum uniformity and cover, individual filaments can be separated before reaching the belt. This is accomplished by inducing an electrostatic charge onto the bundle while under tension and before deposition. The charge may be induced triboelectrically or by applying a high voltage charge. The former is a result of rubbing the filaments against a grounded, conductive surface. The electrostatic charge on the filaments can be at least 30,000 electrostatic units per square meter ($esu/m^2$).

Fine fibers of the disclosure can be made preferably using the electrostatic spinning process. A suitable electrospinning apparatus for forming the fine fibers includes a reservoir in which the fine fiber forming solution is contained, and an emitting device, which generally consists of a rotating portion including a plurality of offset holes. As it rotates in the electrostatic field, a droplet of the solution on the emitting device is accelerated by the electrostatic field toward the collecting media. Facing the emitter, but spaced apart therefrom, is a grid upon which the collecting media (i.e., a substrate or combined substrate) is positioned. Air can be drawn through the grid. A high voltage electrostatic potential is maintained between emitter and grid by means of a suitable electrostatic voltage source. The substrate is positioned in between the emitter and grid to collect the fiber.

Specifically, the electrostatic potential between grid and the emitter imparts a charge to the material which cause liquid to be emitted therefrom as thin fibers which are drawn toward grid where they arrive and are collected on substrate. In the case of the polymer in solution, a portion of the solvent is evaporated off the fibers during their flight to the substrate. The fine fibers bond to the substrate fibers as the solvent continues to evaporate and the fiber cools. Electrostatic field strength is selected to ensure that as the polymer material is accelerated from the emitter to the collecting media, the acceleration is sufficient to render the polymer material into a very thin microfiber or nanofiber structure. Increasing or slowing the advance rate of the collecting media can deposit more or less emitted fibers on the forming media, thereby allowing control of the thickness of each layer deposited thereon. Electrospinning processes usually use polymer solutions with 5-20% solids (on polymer) concentration. Solvents that are safe and easy to use are desired in industrial applications. On the other hand, fibers formed with such solvents often need to survive and perform in a wide variety of environments.

Filter media with high removal efficiency can be manufactured utilizing the polymers and fibers from this disclosure. Typical properties of the filter media are shown in Table 1. In Table 1, LEFS efficiency (Low Efficiency Flat Sheet) refers to the removal efficiency for 0.78 micron latex particles at a face velocity of 20 feet/minute (ft/min) when tested according to ASTM-1215-89.

TABLE 1

| Typical Fiber Parameters | | | | |
|---|---|---|---|---|
| Fiber (size) diameter | 0.01-2 | 0.05-0.8 | 0.1-0.5 | (μ) |
| Layer thickness | 0.1-8 | 0.4-5 | 0.8-4 | (μ) |
| Efficiency | At least 75% | 75-90% | 80-85% | (LEFS) |

The fine fibers of the present disclosure in the form of a layer disposed on a filtration substrate can then be manufactured into filter elements, including flat-panel filters, cartridge filters, or other filtration components. Examples of such filter elements are described in U.S. Pat. Nos. 6,746,517; 6,673,136; 6,800,117; 6,875,256; 6,716,274; and 7,316,723.

Filter elements meeting a MERV 15 or higher rating can be manufactured using filter media (i.e., fine fiber layer on a substrate) of the present disclosure with a LEFS efficiency of 90% or higher (according to ASTM-1215-89). MERV is an acronym for Minimum Efficiency Reporting Value; it is a rating for filter elements for pressure drop and removal efficiency performance under ASHRAE Standard 52.2. Efficiency and pressure drop measurements associated with individual MERV ratings are given in Table 2 (wherein "<" means less than, and "≥" means greater than or equal; "in. W.G." means inch water gauge or simply "inches $H_2O$").

TABLE 2

| | | Minimum Efficiency Reporting Values (MERV) ASHRAE Standard 52.2 | | | | |
|---|---|---|---|---|---|---|
| Group Number | MERV Rating | E1 Average Particle Size Efficiency (PSE) 0.3-1.0 Microns | E2 Average Particle Size Efficiency (PSE) 1.0-3.0 Microns | E3 Average Particle Size Efficiency (PSE) 3.0-10.0 Microns | Average Arrestance (ASHRAE 52.1) | Minimum Final Resistance (in. W.G.) |
| 1 | MERV 1 | — | — | <20% | <65% | 0.3 |
|   | MERV 2 | — | — | <20% | 65-69.9% | 0.3 |
|   | MERV 3 | — | — | <20% | 70-74.9% | 0.3 |
|   | MERV 4 | — | — | <20% | ≥75% | 0.3 |
| 2 | MERV 5 | — | — | 20%-34.9% | — | 0.6 |
|   | MERV 6 | — | — | 35%-49.9% | — | 0.6 |
|   | MERV 7 | — | — | 50%-69.9% | — | 0.6 |
|   | MERV 8 | — | — | 70%-84.9% | — | 0.6 |
| 3 | MERV 9 | — | <50% | ≥85% | — | 1.0 |
|   | MERV 10 | — | 50%-64.9% | ≥85% | — | 1.0 |
|   | MERV 11 | — | 65%-79.9% | ≥85% | — | 1.0 |
|   | MERV 12 | — | 80%-89.9% | ≥90% | — | 1.0 |

TABLE 2-continued

Minimum Efficiency Reporting Values (MERV)
ASHRAE Standard 52.2

| Group Number | MERV Rating | E1 Average Particle Size Efficiency (PSE) 0.3-1.0 Microns | E2 Average Particle Size Efficiency (PSE) 1.0-3.0 Microns | E3 Average Particle Size Efficiency (PSE) 3.0-10.0 Microns | Average Arrestance (ASHRAE 52.1) | Minimum Final Resistance (in. W.G.) |
|---|---|---|---|---|---|---|
| 4 | MERV 13 | <75% | ≥90% | ≥90% | — | 1.4 |
|   | MERV 14 | 75%-84.9% | ≥90% | ≥90% | — | 1.4 |
|   | MERV 15 | 85%-94.9% | ≥90% | ≥90% | — | 1.4 |
|   | MERV 16 | ≥95% | ≥95% | ≥95% | — | 1.4 |

Exemplary Embodiments

1. A fine fiber comprising a core phase and a coating phase; wherein the core phase comprises a polymer and the coating phase comprises a resinous aldehyde composition; and further wherein at least a portion of the polymer is crosslinked by the resinous aldehyde composition.

2. The fine fiber of embodiment 1 which is prepared from a resinous aldehyde composition comprising reactive alkoxy groups and a polymer comprising active hydrogen groups, wherein the molar ratio of resinous aldehyde composition to polymer is such that the molar ratio of reactive alkoxy groups to active hydrogen groups is greater than 10:100.

3. The fine fiber of embodiment 2 which is prepared from the resinous aldehyde composition and the polymer in amounts such that the resinous aldehyde composition is present in an amount of greater than 20 parts by weight per 100 parts by weight of the polymer.

4. The fine fiber of embodiment 2 wherein the active hydrogen groups comprise amido or amino groups.

5. The fine fiber of any one of embodiments 1 through 4 comprising two phases, wherein the core phase comprises a mixture of the polymer and the resinous aldehyde composition.

6. The fine fiber of any one of embodiments 1 through 4 comprising three phases, wherein the core phase comprises the polymer, the coating phase comprises the resinous aldehyde composition, and a transition phase comprises a mixture of the polymer and the resinous aldehyde composition.

7. The fine fiber of any one of embodiments 1 through 6 wherein the polymer comprises a nylon.

8. The fine fiber of embodiment 7 wherein the nylon comprises nylon-6, nylon-6,6, nylon-6,10, mixtures or copolymers thereof.

9. The fine fiber of embodiment 8 wherein the nylon comprises nylon-6-6,6-6,10.

10. The fine fiber of any one of embodiments 1 through 9 wherein the polymer comprises a polyvinyl butyral, an ethylene co-vinyl alcohol co-polymer, or a mixture thereof.

11. The fine fiber of any one of embodiments 1 through 9 wherein the polymer comprises a cellulose derivative selected from the group consisting of ethyl cellulose, hydroxylethyl cellulose, cellulose acetate, cellulose acetate butyrate, cellulose acetate propionate, cellulose acetate phthalate, and mixtures thereof.

12. The fine fiber of any one of embodiments 1 through 9 wherein the polymer comprises a poly(meth)acrylic acid homopolymer or copolymer.

13. The fine fiber of claim 12 wherein the polymer comprises a styrene-(meth)acrylic acid copolymer.

14. The fine fiber of any one of embodiments 1 through 9 wherein the polymer comprises a poly(maleic anhydride) homopolymer or copolymer.

15. The fine fiber of claim 14 wherein the polymer comprises a styrene-maleic anhydride copolymer.

16. The fine fiber of any one of embodiments 1 through 15 wherein the resinous aldehyde composition comprises a resinous formaldehyde composition.

17. The fine fiber of claim 16 wherein the resinous formaldehyde composition comprises a resinous melamine-formaldehyde composition.

18. The fine fiber of any one of embodiments 1 through 15 wherein the resinous aldehyde composition comprises a melamine-aldehyde composition; and wherein the aldehyde comprises formaldehyde, acetaldehyde, butyraldehyde, isobutyraldehyde, or mixtures thereof.

19. The fine fiber of any one of embodiments 1 through 15 wherein the resinous aldehyde composition comprises a condensation product of urea and an aldehyde, a condensation product of phenol and an aldehyde, a condensation product of melamine and an aldehyde, or a mixture thereof.

20. The fine fiber of any one of embodiments 1 through 15 wherein the resinous aldehyde composition comprises a condensation product of benzoguanamine and an aldehyde, a condensation product of glycoluril and an aldehyde, or a mixture thereof.

21. A fine fiber comprising a core phase and a coating phase; wherein the core phase comprises nylon and the coating phase comprises a resinous melamine-aldehyde composition; wherein at least a portion of the nylon is crosslinked by the resinous melamine-aldehyde composition; and further wherein the fine fiber is prepared from a resinous melamine-aldehyde composition in an amount of greater than 20 parts by weight per 100 parts by weight of the nylon.

22. The fine fiber of any one of embodiments 1 through 21 wherein the core phase further comprises a nonreactive polymer.

23. A filter media comprising a filtration substrate and a layer comprising a plurality of fine fibers of any one of embodiments 1 through 22 disposed on the substrate.

24. The filter media of embodiment 23 wherein the fine fiber layer has a thickness of 0.05μ to 30μ.

25. The filter media of embodiment 23 or embodiment 24 wherein the filtration substrate is a non-woven substrate.

26. The filter media of any one of embodiments 23 through 25 wherein the fine fiber layer is an electrospun layer and the filtration substrate comprises a cellulosic or synthetic nonwoven.

27. The fine fiber media of embodiment 26 wherein the filtration substrate comprises a polyester nonwoven, a polyolefin nonwoven, or a blended nonwoven thereof.

28. The fine fiber media of embodiment 27 wherein the filtration substrate comprises polypropylene nonwoven.

29. The fine fiber media of any one f of embodiments 23 through 28 wherein the filtration substrate comprises a spunbonded or melt-blown support.

30. A filter element comprising a fine fiber media of any one of embodiments 23 through 29.

EXAMPLES

Objects and advantages of this disclosure are further illustrated by the following examples, but the particular materials and amounts thereof recited in these examples, as well as other conditions and details, should not be construed to unduly limit this disclosure.

Test Procedures

ESCA

Electron spectroscopy or chemical analysis (ESCA, also known as x-ray photoelectron spectroscopy or XPS) is a surface analysis technique used for obtaining chemical information about the surfaces of solid materials. The materials characterization method utilizes an x-ray beam to excite a solid sample resulting in the emission of photoelectrons. An energy analysis of these photoelectrons provides both elemental and chemical bonding information about a sample surface. The relatively low kinetic energy of the photoelectrons gives ESCA a sampling depth of approximately 3 Å. ESCA can detect all elements from lithium to uranium with detection limits of approximately 0.1 atomic percent. The principal advantage of ESCA is its ability to look at a broad range of materials (polymers, glasses, fibers, metals, semiconductors, paper, etc.) and to identify surface constituents as well as their chemical state. This test can be used as an indicator of migration of the aldehyde compound to the surface of the fiber.

Ethanol Soak Test

A sample of fine fibers in the form of a layer disposed on a substrate is submerged in ethanol (190 proof) under ambient conditions. After 1 minute, the sample is removed, dried, and evaluated for the amount of fine fiber layer efficiency retained as determined according to the procedure described in U.S. Pat. No. 6,743,273 ("Fine fiber layer efficiency retained"). The amount of fine fiber retained is reported as a percentage of the initial amount of fine fibers and referred to as "fine fiber layer efficiency retained." This gives a good indication of whether the degree of crosslinking achieved was sufficient to protect the bulk material from attack/dissolution to ethanol.

Hot Water Soak Test

A sample of fine fibers in the form of a layer disposed on a substrate is submerged in water previously heated to a temperature of 140° F. After 5 minutes, the sample is removed, dried, and evaluated for the amount of fine fiber layer efficiency retained as determined according to the procedure described in U.S. Pat. No. 6,743,273 ("Fine fiber layer efficiency retained"). The amount of fine fiber retained is reported as a percentage of the initial amount of fine fibers and referred to as "fine fiber layer efficiency retained." This gives a good indication of whether the degree of crosslinking achieved was sufficient to protect the bulk material from attack/dissolution to hot water.

Preparation of Fine Fibers

Reference Examples

Reference Example 1 (Example 5 of Chung et al., U.S. Pat. No. 6,743,273) utilizes the formation of a surface coating layer by incorporating oligomers of p-tert-butyl phenol, an additive that protects fine fibers from wet environments.

An alternate method to improve environmental resistance involves blending a self-crosslinkable polymer and a non-self-crosslinkable polymer, resulting in the formation of a structure that is analogous to an IPN (interpenetrating network) or semi-IPN (semi-interpenetrating network) wherein the non-crosslinkable polymer does not redissolve after electrospinning and heat treatment. Reference Example 2 (Example 6 of Chung et al., U.S. Pat. No. 6,743,273) describes how such a structure can be achieved.

Finally, Reference Example 3 (Example 6B of Chung et al., U.S. Pat. No. 6,743,273) combines the surface coating and crosslinking methodologies described in Reference Examples 1 and 2, wherein a significant improvement is made in the environmental resistance of the fine fiber. In this method there are three important components: a non-self-crosslinkable fiber-forming polymer, a self-crosslinkable fiber-forming polymer, and a non-crosslinkable surface-forming additive.

Example 1

Nylon copolymer resin (SVP 651 obtained from Shakespeare Co., Columbia, S.C., a terpolymer having a number average molecular weight of 21,500-24,800 comprising 45% nylon-6, 20% nylon-6,6 and 25% nylon-6,10) solutions were prepared by dissolving the polymer in alcohol (ethanol, 190 proof) and heating to 60° C. to produce a 9% solids solution. After cooling, to the solution was added a melamine-formaldehyde resin (i.e., crosslinking agent) (CYMEL 1133 obtained from Cytec Industries of West Paterson, N.J.). The weight ratio of melamine-formaldehyde resin to nylon was 20:100 parts by weight. Additionally, to the solution was added para-toluene sulfonic acid (7%, based on polymer solids). The solution was agitated until uniform and was then electrospun to form a layer of fine fiber on a filtration substrate. For this example a voltage of 50 kV was used to form the fine fiber layer on a substrate material moving at a line speed of 9 ft/min at a distance 4 inches from the emitter. The substrate material was a wetlaid cellulose media from Hollingsworth and Vose (Grade FA 448) with an average basis weight of 68.6 lbs/3000 ft$^2$, average thickness of 0.011 inch (in), and average Frazier permeability of 16 ft/min. The fine fibers disposed on the substrate were thermally treated at 140° C. for 10 minutes. The media layer formed had an initial LEFS efficiency of 76.5% and an initial pressure drop of 0.87 in of water. In this context, "initial" means prior to any ethanol or water soak testing. See FIG. 2 for test results.

Example 2 and 3

Example 1 was repeated except using weight ratios of 40:100 (Example 2) and 60:100 (Example 3) of the melamine-formaldehyde resin:nylon. Example 2 had an initial LEFS efficiency of 78.1% and an initial pressure drop of 0.90 in of water. Example 3 had an initial LEFS efficiency of 80.3% and an initial pressure drop of 0.91 in of water. In this context, "initial" means prior to any ethanol or water soak testing. See FIG. 2 for test results.

Examples 4-8

Example 1 was repeated except using weight ratios of 20:100 (Example 4), 40:100 (Example 5), 60:100 (Example 6), 80:100 (Example 7), or 100:100 (Example 8) of a melamine-formaldehyde resin (CYMEL 1135):nylon. Also, the fine fibers disposed on the substrate described in Example 1 were thermally treated at 140° C. for dwell times at 0 seconds, 10 seconds, 15 seconds, 20 seconds, or 10 minutes. See FIG. 3 for test results. Additional data for the media samples from Examples 4-8 are in Table 3.

TABLE 3

| Fine Fiber Polymer | LEFS Efficiency (composite) | Pressure Drop (inch H$_2$O) |
|---|---|---|
| Ex 4 (heat treated 10 min) | 78.6 | |
| Ex 5 (heat treated 10 min) | 77.8 | |
| Ex 6 (heat treated 10 min) | 89.8 | 0.8 |
| Ex 7 (heat treated 10 min) | 87.8 | 0.81 |
| Ex 8 (heat treated 10 min) | 85.2 | 0.77 |
| Ref Ex 2 | 78.1 | 0.84 |

Examples 9-11

Example 1 was repeated except using equal weights of the nylon copolymer and the melamine-formaldehyde resin. Example 9 was formed on a wetlaid cellulose media from Hollingsworth and Vose (Grade FA 448) with an average basis weight of 68.6 lbs/3000 ft$^2$, average thickness of 0.011 inch, and average Frazier permeability of 16 ft/min. Example 10 was formed on a wetlaid polyester/cellulose media from Hollingsworth and Vose (Grade FA 352) with an average basis weight of 70 lbs/3000 ft$^2$, average thickness of 0.012 inch, and average Frazier permeability of 14 ft/min, and Example 11 was formed on a wetlaid polyester/glass media from Hollingsworth and Vose (Grade FA 316) with an average basis weight of 70 lbs/3000 ft$^2$, average thickness of 0.021 inch, and average Frazier permeability of 31 ft/min. See FIGS. 1, 4A/B, and 5 for test results.

Example 12

Example 1 was repeated except using a different melamine-formaldehyde resin (sold as RESIMENE HM 2608 by INEOS Melamines) and a weight ratio of nylon:melamine-formaldehyde of 100:40. The fine fiber sample was formed on a wetlaid cellulose media from Hollingsworth and Vose (Grade FA 448) with an average basis weight of 68.6 lbs/3000 ft$^2$, average thickness of 0.011 inch, and average Frazier permeability of 16 ft/min. See FIG. 15 for test results.

Example 13-15

Example 12 was repeated except using a blend of the nylon copolymer and a nonreactive polymer (poly(4-vinyl pyridine) (P4VP)) using a nylon solution of 6% solids in ethanol. The weight ratio of nylon:P4VP was 100:50. The melamine-formaldehyde resins from Examples 1 and 12 were used. For Examples 13 and 14, the weight ratios of nylon:melamine-formaldehyde resin (SVP 651:CYMEL 1133) were 100:40 and 100:100, respectively. For Example 15, the weight ratio of nylon:melamine-formaldehyde resin (SVP 651:RESIMENE HM 2608) was 100:40. The samples were formed on a wetlaid cellulose media from Hollingsworth and Vose (Grade FA 448) with an average basis weight of 68.6 lbs/3000 ft$^2$, average thickness of 0.011 inch, and average Frazier permeability of 16 ft/min. See FIG. 15 for test results.

Examples 16-17

Fine fiber samples were prepared using poly(vinyl butyral) ("PVB") 60T and 60HH donated by Kuraray America, Inc. of Houston, Tex. According to Kuraray, the percent of reactive OH groups for 60T=24-27% and for the 60HH=12-16%. For the 60T (Example 16), a 7% solution, and for the 60HH (Example 17) a 6% solution, in 190 proof ethanol was prepared (solutions were not heated). The solutions employed for preparing the fine fiber samples also contained melamine-formaldehyde resin (herein "ME" or simply "melamine resin") (CYMEL 1133), such that the weight ratio of ME:PVB was 40:100. An acid catalyst was used as in Example 1. Once spun (using the procedure of Example 1), the fine fiber samples were subsequently subjected to thermal treatment (as in Example 1) to facilitate the crosslinking reaction between OH groups present in PVB and the alkoxy (methoxy and butoxy in this case) groups of the melamine resin. The samples were formed (as in Example 1) on a wetlaid cellulose media from Hollingsworth and Vose (Grade FA 448) with an average basis weight of 68.6 lbs/3000 ft$^2$, average thickness of 0.011 inch, and average Frazier permeability of 16 ft/min. See FIG. 16 for test results.

Examples 18-19

Fine fiber samples were prepared using poly(vinyl butyral) ("PVB") 60T and 60HH donated by Kuraray America, Inc. of Houston, Tex. The percent of reactive OH groups for 60T=24-27% and for the 60HH=12-16%. For the 60T (Example 18), a 7% solution, and for the 60HH (Example 19), a 6% solution, in 190 proof ethanol, were prepared (solutions were not heated). The solutions employed for preparing the fine fiber samples also contained melamine resin (RESIMENE HM 2608) in an amount such that the weight ratio of ME:PVB was 40:100. An acid catalyst was used as in Example 1. Once spun (using the procedure of Example 1), the fine fiber samples were subsequently subjected to thermal treatment (as in Example 1) to facilitate the crosslinking reaction between OH groups present in PVB and the alkoxy (methoxy and butoxy in this case) groups of the melamine resin. The samples were formed (as in Example 1) on a wetlaid cellulose media from Hollingsworth and Vose (Grade FA 448) with an average basis weight of 68.6 lbs/3000 ft$^2$, average thickness of 0.011 inch, and average Frazier permeability of 16 ft/min. See FIG. 16 for test results.

Example 20

Fine fiber samples were prepared using polyacrylic acid (PAA) obtained from Aldrich Chemicals (Mw approximately 450,000; Tg approximately 106° C.). The solutions employed (in 190 proof ethanol) for preparing the fine fiber samples also contained melamine resin (ME) (PAA:ME of 100:60) (CYMEL 1133). The solutions were not heated but an acid catalyst was used as in Example 1. Once spun (using the procedure of Example 1), the fine fiber samples were subsequently subjected to thermal treatment (as in Example 1) to facilitate the crosslinking reaction between the COOH groups present in PAA and the alkoxy (methoxy and butoxy in this case) groups of the melamine resin. The samples were formed (as in Example 1) on the cellulose media of Example 1. The measured fiber diameter ranged from 200 nm to 300 nm. See FIGS. 12 and 13 for test results.

Example 21

Fine fiber samples were prepared using poly(vinyl butyral) (PVB) 60T donated by Kuraray America, Inc. of Houston, Tex. The solutions employed for preparing the fine fiber samples also contained melamine (ME) resin (PVB:ME 100:60) (CYMEL 1133). The solutions were not heated but an acid catalyst was used as in Example 1. Once spun (using the procedure of Example 1), the fine fiber samples were subsequently subjected to thermal treatment (as in Example 1) to facilitate the crosslinking reaction between OH groups present in PVB and the alkoxy (methoxy and butoxy in this case) groups of the melamine resin. The samples were formed (as in Example 1) on the cellulose media of Example 1. The measured fiber diameter ranged from 200 nm to 300 nm. See FIG. 14 for test results.

Examples 22-24

Fine fiber samples were prepared as in Examples 4-8 using CYMEL 1135 except using weight ratios of 20:100 (Example 22), 40:100 (Example 23), and 100:100 (Example 24) of the melamine-formaldehyde resin:nylon. Also, the substrate material on which the fine fibers were collected was stationary and samples were collected for 5 minutes. These samples were thermally treated at 140° C. for 10 minutes. See Table 4 for test results.

Examples 25-29

Fine fiber samples were prepared as in Example 1 using CYMEL 1133 except using weight ratios of 0:100 (Example 25 or "Pure PA" (nylon with no melamine-formaldehyde resin)), 5:100 (Example 26), 10:100 (Example 27), 20:100 (Example 28), and 60:100 (Example 29) of the melamine-formaldehyde resin:nylon. Also, the substrate material on which the fine fibers were collected was stationary and samples were collected for 5 minutes. And, a portion of each sample was thermally treated at 140° C. for 10 minutes, and a portion was not. See Table 6 for test results.

Examples 30-33

Fine fiber samples were prepared as in Example 1 using CYMEL 1133 except using weight ratios of 60:100 (Examples 30-32) and 40:100 (Example 33) of the melamine-formaldehyde resin:nylon. Also, the substrate material on which the fine fibers were collected was moving at a line speed of 5 ft/min. See Table 7 for test results.

Results: Bulk Properties of the Fine Fibers

The fine fiber samples produced in Examples 1-33 had an average fiber diameter of no greater than 10 microns. Typically, they possessed average fiber diameters ranging from 200 nm to 400 nm, as measured by Scanning Electron Microscopy (SEM). Certain of the samples were evaluated for fiber morphology, particle capture efficiency (LEFS—particle capture efficiency at 0.8 μm latex particles, bench operating at 20 ft/min per ASTM Standard F1215-89), humidity resistance, and crosslinking efficiency.

Fiber Morphology

A key feature of the fine fibers of the present disclosure is the absence of any adverse effect of the resinous aldehyde composition on the fiber formation properties of the polymer used. FIG. 1 compares the SEM images of the fibers obtained from Reference Example 2 and a fiber of Example 9 ("polyamide:melamine=1:1" or nylon:melamine-formaldehyde weight ratio of 1:1). Both fiber layers were fixated on the same substrate material. Clearly both fiber formation and the resulting fiber diameters are very similar. The absence of an adverse effect of the resinous aldehyde composition (melamine-formaldehyde resin in this example) on the fiber forming ability of the polymer (nylon in this example) suggests that particle capture efficiency would be largely unaffected as well. FIG. 2 confirms this assertion with respect to the fine fibers of Examples 1-3.

Crosslinking Kinetics

In addition, the crosslinking reaction can be carried out as fast as Reference Example 2 (see FIG. 3). The figure compares the crosslinking kinetics of the fiber of Reference Example 2 (a methoxy-methyl nylon-6) with fine fibers of the present disclosure (Examples 4-8) by comparing the amount of fine fiber layer efficiency retained after an ethanol soak test (for 1 min). Soaking an electrospun fine fiber sample in ethanol gives a good indication of whether the degree of crosslinking achieved was sufficient to protect the bulk material from attack/dissolution. All fiber layers were formed on the same substrate. Dwell time refers to the exposure time at an elevated temperature to which the samples were subjected after fiber formation. Fine fiber efficiency retained on samples subjected to the ethanol soak indicate that crosslinking was sufficient to provide the desired protection.

Effect of Melamine-Formaldehyde Content on Wetting Behavior

The aqueous contact angle on the fiber webs of Examples 22-24 was measured for the various melamine-formaldehyde resin to nylon weight ratios). Table 4 shows an increase in wetting angle (compared to Reference Example 2), as expected, but the trend relative to melamine-formaldehyde content was not what was expected.

TABLE 4

| Composition vs. Contact Angle | | | |
|---|---|---|---|
| Composition | Initial | After 5 sec. | After 30 sec. |
| Ref. Ex 2 | 69.4 | 68.7 | 67.4 |
| Ex 22 | 88.8 | 88.7 | 88.4 |
| Ex 23 | 81.3 | 81.1 | 81.0 |
| Ex 24 | 78.0 | 77.5 | 77.0 |

On Reference Example 2 fiber mats, droplets were absorbed into substrate after 100 seconds. On the fine fiber mats of Examples 22-24, droplets did not disappear after 100 seconds.

Effect of Catalyst Level

The recommended catalyst level of melamine-formaldehyde resin is usually less than 2% of solids (for typical three-dimensional products such as films). In the case of one-dimensional fibers, a higher level of catalyst is desired to obtain sufficiently fast crosslinking speed. It is believed that the active catalyst species has to travel along the fiber axis, instead of along usual three dimensional directions. Thus, preferred catalyst concentrations are at least 4 wt-%, based on polymer solids for preferred crosslinking rates.

Environmental Resistance

Adding the melamine-formaldehyde resin results in both crosslinking and fiber surface protection due to the migration of the melamine-formaldehyde resin. The contact angle data described in Table 4 suggests that while melamine-formaldehyde resin is on the surface, the presence of melamine-formaldehyde resin does not necessarily lead to a higher contact angle. From an environmental-resistance perspective, the effects of ethanol and humidity were tested on different filter media (flat sheet) of Reference Example 2 fiber versus the fine fibers of Examples 9-11 (melamine-formaldehyde:nylon weight ratio of 1:1). FIGS. 4A and 4B show that following ethanol and hot water soak both materials demonstrate similar levels of fine fiber layer efficiency retained.

To test the longer term impact of humid environments the filter media were tested in a temperature-humidity chamber (THC) (exposure times are on the x-axis; test procedure as described in U.S. Pat. No. 6,743,273 wherein T=140° F., 100% RH, and flow rate of 10 ft/min). In FIG. 5, the fibers of Examples 9-11 clearly exhibit better humidity resistance at 100% RH (Relative Humidity) and 140° F. due to the surface migration and crosslinking ability of the melamine-formaldehyde additive. Also included in the plot are results for Reference Example. Three different substrates were used as described in Table 5).

Additional data for the filter media samples used in FIGS. 4-5 are shown in Table 5. In Table 5, "initial" means prior to any ethanol or water soak testing.

TABLE 5

| Fine Fiber Polymer | Substrate | LEFS Efficiency (composite) | Pressure Drop (inch H$_2$O) |
|---|---|---|---|
| FIG. 4A | | | |
| Ex 9 | 1 | 84.6 (initial) | 0.86 (initial) |
| Ref Ex 2 | 1 | 83.8 (initial) | 0.87 (initial) |
| Ex 10 | 2 | 76 (initial) | 0.88 (initial) |
| Ref Ex 2 | 2 | 74.5 (initial) | 0.88 (initial) |
| Ex 11 | 3 | 74.8 (initial) | 0.5 (initial) |
| Ref Ex 2 | 3 | 71.3 (initial) | 0.52 (initial) |
| FIG. 4B | | | |
| Ex 9 | 1 | 81.6 (initial) | 0.84 (initial) |
| Ref Ex 2 | 1 | 77.6 (initial) | 0.79 (initial) |
| Ex 10 | 2 | 72.7 (initial) | 0.84 (initial) |
| Ref Ex 2 | 2 | 66.8 (initial) | 0.77 (initial) |
| Ex 11 | 3 | 76.7 (initial) | 0.49 (initial) |
| Ref Ex 2 | 3 | 69.6 (initial) | 0.54 (initial) |
| FIG. 5 | | | |
| Ex 9 | 1 | 84.1 (initial) | 0.83 (initial) |
| Ref Ex 2 | 1 | 83.4 (initial) | 0.82 (initial) |
| Ex 10 | 2 | 81.3 (initial) | 0.92 (initial) |
| Ref Ex 2 | 2 | 80.5 (initial) | 0.86 (initial) |
| Ex 11 | 3 | 73 (initial) | 0.46 (initial) |
| Ref Ex 2 | 3 | 73.4 (initial) | 0.53 (initial) |

Substrate 1: wetlaid cellulose media from Hollingsworth and Vose (Grade FA 448) with an average basis weight of 68.6 lbs/3000 ft$^2$, average thickness of 0.011 inch, and average Frazier permeability of 16 ft/min.
Substrate 2: wetlaid polyester/cellulose media from Hollingsworth and Vose (Grade FA 352) with an average basis weight of 70 lbs/3000 ft$^2$, average thickness of 0.012 inch, and average Frazier permeability of 14 ft/min.
Substrate 3: wetlaid polyester/glass media from Hollingsworth and Vose (Grade FA 316) with an average basis weight of 70 lbs/3000 ft$^2$, average thickness of 0.021 inch, and average Frazier permeability of 31 ft/min.

Effect of Different Melamine-Formaldehyde Resins

FIG. 15 shows the fine fiber layer efficiency retention data (after exposure to the alcohol soak test) for the fine fibers of Examples 2 and 12-13. This data demonstrates that fine fibers of the disclosure can be formed using different types of melamine-formaldehyde resin (Example 2 using CYMEL 1133 and Example 12 using RESIMENE HM 2608). CYMEL 1133 does not self-crosslink whereas RESIMENE HM2608 does self-crosslink. The fine fibers of Examples 13-15 demonstrate that the fine fiber layer efficiency retention can be controlled by the amount and type of melamine-formaldehyde resin.

Effect of Number of Active Hydrogen Groups on LEFS

FIG. 16 demonstrates that even with low percentages of active hydrogen groups (12-16% OH groups) good fiber crosslinking was achieved (as demonstrated by post-ethanol soak LEFS results) in Examples 16-19.

Results: Surface Properties of the Fine Fibers
Surface Analysis of Fine Fibers from Polyamide and Melamine Resin
XPS Data The wetting results (contact angle; Table 4) clearly suggest that fiber surface undergoes some sort of modification. In order to better understand the surface phenomena, ESCA analysis was conducted at Evans Analytical Group, Chaska, Minn. By looking at binding energy level 533 eV (reflects C—O from melamine) and 531 eV (reflects C=O of amide linkage), the relative composition on the surface to a depth of 5 nm was evaluated. Because pure polyamide fiber mat (without the melamine-formaldehyde crosslinker) also shows some presence of C—O linkage, it is difficult to perform a detailed quantitative analysis. The results of the ESCA analysis are shown in Table 6. A consistent trend of an increase of the C—O area in the surface layer with increasing melamine-formaldehyde resin content was observed. This clearly confirms surface migration of the melamine-formaldehyde resin with increasing melamine-formaldehyde resin content. "Pure ME" refers to the melamine-formaldehyde composition used tested received (in liquid form) and thermally treated at 140° C. for 10 minutes.

TABLE 6

| | Oxygen Chemical States (in % of total O) | | |
|---|---|---|---|
| Composition | Thermal Treatment | C=O % area | C—O % area |
| Pure ME | Yes | — | 100 |
| Ex 25 (Pure PA) | No | 84 | 16 |
| Ex 26 | No | 89 | 11 |
| | Yes | 84 | 16 |
| Ex 27 | No | 76 | 24 |
| | Yes | 73 | 27 |
| Ex 29 | No | 26 | 74 |
| | Yes | 41 | 59 |

C60 Ion Gun Sputtering

Additionally, systematic depth profiling experiments were conducted on the pure polyamide fibers of Reference Example 1 and the Example 29 fine fibers using a C60 (buckminsterfullerene or buckyball) ion gun. This technique results in surface layer-by-layer removal due to the sputtering; with negligible overall sample damage. For the pure polyamide fibers of Reference Example 1 there is negligible change in the C, N, and O(C1s, N1s, and O1s) concentration with sputtering time (see FIG. 6). In addition, negligible changes in the C1s spectrum are observed (see FIG. 7) for Reference Example 1.

In contrast, the depth profiling experiments on the Example 29 fine finger shows significant changes taking place. Spectral changes are quite dramatic in the beginning and slower for higher sputtering times (see FIG. 8).

FIG. 9 upper shows that the surface composition of a fiber of the disclosure (Example 29) is different than the bulk fiber composition. The surface composition is higher in nitrogen and oxygen and lower in carbon than the bulk of the fiber. The C1s profile is separated into two components: 1) contribution from melamine and 2) from the nylon (FIG. 9 lower). Separating the C1s profile one sees an increase in the contribution from the nylon component with sputtering time until it becomes constant. Correspondingly, one observes a decrease in the C1s contribution from the coating component. Based on the results shown in the figure, three regions can be identified: (1) the top initial layer (5 nm or so) corresponding up to 1 min sputter time is the melamine-formaldehyde resin layer; (2) a large middle region (1 min to 40 min sputter time) where the layer consists of a mixture of melamine-formaldehyde resin and nylon and (3) the bottom regions (40-60 min sputter time) indicating a dominant presence of the polyamide (nylon). Thus, in contrast to Reference Examples 2 and 3, the addition of melamine-formaldehyde resin at a level of 60:100 (i.e., 60 parts resinous aldehyde composition to 100 parts polymer) (Example 29) confers a three-level structure: a very high concentration of melamine-formaldehyde resin on the surface, a varying ratio in the middle layer, and, finally, a dominance of polyamide (nylon) in the interior (see FIG. 11A).

It is expected that lowering the melamine-formaldehyde content (e.g., below a weight ratio of 20:100) would affect the three-level structure, which would eventually lead to a more homogenous distribution of the melamine-formaldehyde resin through the fiber cross-section. In contrast to the data in FIG. 9 lower (fibers of Example 29), the melamine C1s concentration decreases in a steady manner (FIG. 10, fibers of Example 28), after an initial drop, but then does not level off as it does in FIG. 9 lower. This suggests that the melamine-formaldehyde resin coating is significantly thinner and a majority of the melamine is distributed throughout the cross-section of the fiber (see FIG. 11B). This clearly gives credence to the hypothesis that a large increase in resinous aldehyde resin beyond (i.e., greater than) a weight ratio of resinous aldehyde composition to polymer material of the fine fibers of Example 28 (20:100, i.e., 20 parts resinous aldehyde composition to 100 parts polymer) results in both surface migration (altering fiber surface properties) and traditional crosslinking, thereby improving bulk properties.

Surface Analysis of Fine Fiber from Polyacrylic Acid and Melamine Resin

The surface of the fine fiber of Example 20 was analyzed by Evans Analytical Groups using ESCA. As expected from the polyamide results, melamine-formaldehyde clearly migrates to the surface as indicated by the high concentration of atomic N (FIG. 12). The C1s spectrum in FIG. 13 shows the most dramatic changes in the depth profile occurred Within the first 3 to 5 minutes of sputtering (C60). The sputtering data shows that C1s spectrum changed from the one consistent with the melamine based coating to the one resembling that of PAA Control fibers (prepared as the fibers of Example 20 without the melamine-formaldehyde resin).

The spectrum shows that there was still a significant concentration in the middle of the spectrum, around 287 eV, between hydrocarbon and O—C═O lines. This intensity is probably consistent with residual melamine-formaldehyde resin. Interestingly, it drops and then remains at the 10 atom % level throughout the rest of the profile. The fact that this residual coating was not removed by the sputter beam may be associated with the surface roughness of the material. Unlike the polyamide samples, the PAA samples (both PAA Control and Example 20 samples) show tremendous adhesion to the cellulose substrate and thereby could not be separated from the substrate without leaving adhered fine fiber, thereby explaining the surface roughness phenomenon.

Surface Analysis of Fine Fibers from Poly(Vinyl Butyral) and Melamine Resin

The surface of the fibers of Example 21 was analyzed by Evans Analytical Groups using ESCA with results shown in FIG. 14. PVB appeared to have a melamine-formaldehyde resin coating based on the presence of high level N and the shape of C1s spectra (FIG. 14). As anticipated, both N and O concentrations decreased gradually over the course of the depth profile, while the C content increased. However, the changes observed in the depth profile of fibers of Example 21 (and PVB Control fibers, which were prepared as the fibers of Example 21 without the melamine-formaldehyde resin) possibly reflect the deterioration (under the ion beam) of the material and as such no interface was observed in this profile.

High Efficiency Filter Media

Filter media with high particle removal efficiency was manufactured using the polymers and fibers from this disclosure. The materials tested for filtration efficiency as shown in Table 7 were manufactured as described above for Examples 30-33.

TABLE 7

| Example No. | LEFS Efficiency (composite) | Pressure Drop (in H$_2$O) |
|---|---|---|
| Ex 30 | 93.6 | 0.83 |
| Ex 31 | 94.1 | 0.77 |
| Ex 32 | 92.6 | 0.78 |
| Ex 33 | 94.3 | 0.79 |

Discussion of Results

Phenolic resin, epoxy resin, and melamine resin can be used as a crosslinker of polyamide resin. Use of melamine resin as one possible crosslinker among others has been disclosed in Lodhi et al., US Patent Publication No. 2007/0082393A1 and Chen et al., International Patent Publication WO 2009/064767A2. Additionally, Ballard, U.S. Pat. No. 4,992,515 discloses the uses of melamine-formaldehyde resin to obtain crosslinked nylon terpolymer for use as coatings in sewing applications. However, in all cases, the use of the melamine resin is limited to its potential as a crosslinker for polyamide terpolymer. In conventional crosslinking applications, the crosslinker is employed in amounts sufficient (typically less than 15 wt-% base on polymer) to crosslink the polymer to a degree that comports with the desired end properties. For example, in fiber formation, excess crosslinking of the polymer material leads to brittleness and loss of elasticity.

Nevertheless, in the present disclosure, it has been found that a relatively large amount of a resinous aldehyde composition in the fiber formation, e.g., an amount of melamine-aldehyde composition, that is higher than 20 weight percent unexpectedly results in drastic improvements in both bulk and surface properties when employed with a polymer material that is crosslinkable with the resinous aldehyde composition. These properties arise without sacrificing the fiber-forming ability of the polymer solution. In contrast, the other types of crosslinkers (phenolic and epoxy) can have an adverse impact on the bulk properties, and do not affect surface properties (e.g., contact angle).

When the polymer material is a polyamide/nylon blend, for example, use of an excess or a resinous aldehyde composition, such as a melamine-aldehyde composition, results in increased tensile strength relative to the polyamide fibers (without the melamine-aldehyde) composition. Further, the surface properties of the fibers of the disclosure are improved, as evidenced by an increase in the contact angle of polar liquids on the fine fiber webs of the disclosure relative to polyamide fine fibers in the absence of the resinous aldehyde composition.

The ratios of polymer material to aldehyde (e.g., melamine-aldehyde) composition employed in conventional mixtures or blends where the aldehyde composition is employed as a crosslinker, the weight ratios of aldehyde composition to polymer material, typically range, for example, from 0.1:100 to 5:100. In the case of polyamide mixtures or blends with resinous aldehyde (e.g., melamine-aldehyde) composition, as high as 15:100 or even 18:100 (aldehyde composition:polymer material) have been used. Such ratios lead to mixtures or blends of polyamide and resinous aldehyde (e.g., melamine-aldehyde) that are either simply crosslinking in nature or are substantially uniform in composition throughout the fibers formed therefrom.

However, the weight ratios of polymer material to aldehyde composition employed to form the fibers of the disclosure preferably range from 100:20 to 100:200, for example, in some embodiments 100:200 to 100:100, in other embodiments 100:175 to 100:25, in other embodiments 100:175 to 100:125, in other embodiments 100:150 to 100:30, in other embodiments 100:150 to 100:75, in other embodiments 100:125 to 100:40, in other embodiments 100:125 to 100:60, in other embodiments 100:125 to 100:50, in other embodiments 100:100 to 100:50, and in other embodiments 100:100 to 100:60. Unexpectedly, such ratios lead to formation of the exterior resinous aldehyde (e.g., melamine-aldehyde) layer and the dramatic improvements in bulk and surface properties.

Without being limited as to theory, it is believed that the reason these benefits occur is that once the polymer material is crosslinked, the remaining aldehyde composition forms a shell and coats the surface of the fiber as the fiber is formed. The coating is compositionally different from the interior of the fiber, wherein a core-shell type morphology results. Thus, when formed into a fiber, the blend of polymer material and resinous aldehyde (e.g., melamine-aldehyde) composition, at appropriate mixing or blending ratios, forms at least two concentric phases. The fibers of the disclosure have an inner or core phase that includes the polymer material, and at least one concentric phase surrounding the inner phase that includes the resinous aldehyde (e.g., melamine-aldehyde) composition. The presence of the resinous aldehyde (e.g., melamine-aldehyde) composition phase at the outer surface of the fibers of the disclosure, in turn, gives rise to enhanced performance parameters when a fibrous web of the disclosure is formed on a substrate and subsequently employed in a filtration application.

Turning to FIG. 11A/B, two observed embodiments of the concentric phase fiber formation is shown. FIG. 11A represents a first embodiment, wherein a cross-sectional representation of a single fine fiber 100 of the disclosure and its layered structure is shown. The first phase 10 is an internal axial polymer phase that includes the polymer material, wherein the polymer material is the only material in the phase, or it is at least 50 wt-% (weight percent) of the material in the phase, and preferably the predominant material (greater than 50 wt-% of the material in that phase). The first phase includes, in various embodiments of fiber 100, between 50 wt-% and 100 wt-% polymer material, or in some embodiments between 75 wt-% and 95 wt-% of the polymer material. The balance of the first phase 10 is, in some embodiments, the aldehyde (e.g., melamine-aldehyde) composition. The first phase is surrounded by a second coating phase 20 that includes both the polymer material and the resinous aldehyde (e.g., melamine-aldehyde) composition, wherein the weight ratio of polymer material to resinous aldehyde composition is less than that of the first phase 10 and wherein the second phase includes between 10 wt-% and 75 wt-% polymer material, or in some embodiments between 25 wt-% and 50 wt-% polymer material. Depending on the particular polymer material chosen and the amount of reactive aldehyde composition selected, some proportion of the resinous aldehyde (e.g., melamine-aldehyde) composition of the second phase 20 can crosslink polymer chains contiguous the internal axial polymer phase 10. In other words, some proportion of the resinous aldehyde (e.g., melamine-aldehyde) composition causes some degree of crosslinking of available reactive moieties of the polymer material in the first phase 10, including active hydrogen moieties, pendant to the polymer backbone and contiguous to second phase 20. The fine fiber 100 additionally contains a third exterior phase 30 that includes a majority, that is, greater than 50 wt-% or more of the resinous aldehyde (e.g., melamine-aldehyde) composition, wherein the weight ratio of polymer material to resinous aldehyde (e.g., melamine-aldehyde) composition is less than that of the second phase 20 and wherein the third phase includes between 0 wt-% and 50 wt-% polymer material, or in some embodiments between 5 wt-% and 25 wt-% polymer material.

The three phase embodiment of the disclosure as shown in FIG. 11A is formed, in some embodiments, where the polymer material is a polyamide and the resinous aldehyde composition is a melamine-formaldehyde composition, further wherein the fiber is electrospun from a blend of polyamide:melamine-formaldehyde weight ratio of 100:100 to 100:25, or 100:75: to 100:50, or 100:60. While it is known to crosslink a polyamide with a melamine-formaldehyde composition, the weight ratios employed to form the fine fibers of the disclosure are not reflective of the ratios conventionally used to incur crosslinking of a polyamide with a melamine composition. Conventional weight ratios of polymer to crosslinker are, for example, 100:0.1 to 100:5 (or, alternatively stated, resinous aldehyde composition: polymer of 0.1:100 to 5:100). However, it is advantageous to use significantly higher amounts of resinous aldehyde composition, as mentioned above, to form the fiber of the disclosure, because of the unexpected and surprising result that the phase separation and concomitant core-shell type morphology formed translates to significant performance improvements, as will be discussed further below.

FIG. 11B represents a second embodiment of the disclosure, wherein a cross-sectional representation of a single fine fiber 102 of the disclosure is shown. The first phase 12 is an internal axial polymer phase that typically includes a mixture of the polymer material and the resinous aldehyde composition. The first phase includes, in various embodiments of fiber 102, between 25 wt-% and 100 wt-% polymer material, or in some embodiments between 50 wt-% and 75 wt-% polymer material. The balance of the first phase 12 is, in some embodiments, the resinous aldehyde (e.g., melamine-formaldehyde) composition. The first phase 12 is surrounded by a second coating phase 22 that includes a majority, that is, greater than 50 wt-% or more, of the resinous aldehyde composition, and wherein the weight ratio of polymer material to resinous aldehyde composition is less than that of the first phase 12. Depending on the particular polymer material chosen and the amount of reactive melamine composition selected, some proportion of the reactive melamine composition of the second phase 22 can crosslink polymer chains contiguous the internal axial polymer phase 12. In other words, some proportion of the resinous aldehyde composition causes some degree of crosslinking of available reactive moieties of the polymer material in the first phase 12, including active hydrogen moieties, pendant to the polymer backbone and contiguous to second phase 22.

In three-phase embodiments of the disclosure, the outer coating phase can be characterized as a region wherein the resinous aldehyde comprises greater than 50 molar % of the coating composition and the core phase comprises a region where the polymer material comprises greater than 50 molar % of the core composition. In addition, the crosslinked transition phase between the outer coating phase and the core phase is characterized by a non-homogenous composition wherein the molar % of the resinous aldehyde decreases from the coating phase to the core phase. In some embodiments, the core phase is a homogenous composition with a relatively high percentage of polymer material and a relatively low percentage of resinous aldehyde and the coating phase is a homogenous composition with a relatively low percentage of polymer material and a relatively high percentage of resinous aldehyde. In some embodiments, the polymer material comprises greater than 75 molar % of the composition of the core phase. In some embodiments, the resinous aldehyde comprises greater than 75 molar % of the coating phase.

The two phase embodiment shown in FIG. 11B is formed, in some embodiments, where the polymer material is a polyamide and the resinous aldehyde composition is a melamine-formaldehyde composition, further wherein the fiber is electrospun from a blend of polyamide:melamine-formaldehyde weight ratio of 100:50 to 100:10, or 100:25: to 100:15, or 100:20. While it is known to crosslink a polyamide with a melamine-formaldehyde composition, the weight ratios employed to form the fine fibers of the disclosure are not reflective of the ratios conventionally used to incur crosslinking of a polyamide with a melamine-formaldehyde composition. Conventional weight ratios of polymer to crosslinker are, for example, 100:0.1 to 100:5 (or, alternatively stated, resinous aldehyde composition:polymer of 0.1:100 to 5:100). However, we have found it advantageous to use significantly higher amounts of resinous aldehyde (e.g., melamine-formaldehyde) composition, as mentioned above, to form the fiber of the disclosure, because of the unexpected and surprising result that the phase separation and concomitant core-shell type morphology formed translates to significant performance improvements, as will be discussed further below.

The two- or three-phase embodiments shown in FIG. 11A/B as well as other morphologies are envisioned and are within the scope of the disclosure. Such morphologies arise by varying the type and amount of polymer material and resinous aldehyde composition, and further by varying the method employed to form the fine fibers of the disclosure (electrospinning, melt-blowing, rotary spinning and the like). The fine fibers are made with a ratio of resinous aldehyde (e.g., melamine-formaldehyde) composition to polymer material that includes a surprisingly large amount of resinous aldehyde (e.g., melamine-aldehyde) composition, that is, an amount that is substantially greater than the amount required for the resinous aldehyde composition to crosslink available reactive polymer moieties in a conventional blend. The excess amount is available to form one or more coating phases, and/or exterior phases similar to the morphologies shown in FIG. 11A/B. The exterior coating layer, e.g., of melamine-formaldehyde, results in improved filtration properties, including heat and humidity resistance of the fine fibers and fine fiber layers of the disclosure. The exterior coating layer also affects the surface properties of the fine fiber layer. It has been observed that the presence of a high proportion of aldehyde resin in the outer layer of the fine fibers results in an increase of the observed contact angle for water of a web of the fine fibers of the disclosure.

Without being limited by theory, it is believed that the melamine resin (or other resinous aldehyde) migrates faster to the surface of the fine fibers due to the small diameter of the fine fibers. This faster migration allows the coating to form faster on the fine fiber than it does on larger fibers manufactured by other manufacturing processes. Regarding the fiber morphologies of the fine fibers of the disclosure, it is surprising that the excess aldehyde composition would phase separate from the polymer material in the manner observed, wherein the aldehyde composition forms a coating phase on the exterior of the fiber, yet interacts to crosslink sufficient polymer chains in the contiguous phase. As a result, the fine fibers of the disclosure present the advantageous characteristics of flexibility of the polyamide with added strength and environmental stability associated with, e.g., melamine-aldehyde resins.

The complete disclosures of the patents, patent documents, and publications cited herein are incorporated by reference in their entirety as if each were individually incorporated. While the disclosure is susceptible to various modifications and alternative forms, specifics thereof have been shown by way of example and drawings, and will be described in detail. It should be understood, however, that the disclosure is not limited to the particular embodiments described. On the contrary, the intention is to cover modifications, equivalents, and alternatives falling within the spirit and scope of the disclosure.

The invention claimed is:

1. A fine fiber comprising a core phase and a coating phase;
   wherein the core phase comprises a polymer and the coating phase comprises a resinous aldehyde composition; wherein at least a portion of the polymer is crosslinked by the resinous aldehyde composition; wherein the resinous aldehyde composition is present in an amount of greater than or equal to 40 parts per weight per 100 parts per weight of the polymer and less than or equal to 100 parts by weight per 100 parts by weight of the polymer; and further wherein the fine fiber does not include polyvinyl alcohol crosslinked with melamine-formaldehyde.

2. The fine fiber of claim 1 which is prepared from a resinous aldehyde composition comprising reactive alkoxy groups and a polymer comprising active hydrogen groups, wherein the molar ratio of resinous aldehyde composition to polymer is such that the molar ratio of reactive alkoxy groups to active hydrogen groups is greater than 10:100.

3. The fine fiber of claim 2 wherein the active hydrogen groups comprise amido or amino groups.

4. The fine fiber of claim 1 comprising two phases, wherein the core phase comprises a mixture of the polymer and the resinous aldehyde composition.

5. The fine fiber of claim 1 comprising three phases, wherein the core phase comprises the polymer, the coating phase comprises the resinous aldehyde composition, and a transition phase comprises a mixture of the polymer and the resinous aldehyde composition.

6. The fine fiber of claim 1 wherein the polymer comprises a nylon.

7. The fine fiber of claim 6 wherein the nylon comprises nylon-6, nylon-6,6, nylon-6,10, mixtures or copolymers thereof.

8. The fine fiber of claim 7 wherein the nylon comprises nylon-6-6,6-6,10.

9. The fine fiber of claim 1 wherein the polymer comprises a polyvinyl butyral, an ethylene co-vinyl alcohol co-polymer, or a mixture thereof.

10. The fine fiber of claim 1 wherein the polymer comprises a cellulose derivative selected from the group consisting of ethyl cellulose, hydroxyl ethyl cellulose, cellulose acetate, cellulose acetate butyrate, cellulose acetate propionate, cellulose acetate phthalate, and mixtures thereof.

11. The fine fiber of claim 1 wherein the polymer comprises a poly(meth)acrylic acid homopolymer or copolymer.

12. The fine fiber of claim 11 wherein the polymer comprises a styrene-(meth)acrylic acid copolymer.

13. The fine fiber of claim 1 wherein the polymer comprises a poly(maleic anhydride) homopolymer or copolymer.

14. The fine fiber of claim 13 wherein the polymer comprises a styrene-maleic anhydride copolymer.

15. The fine fiber of claim 1 wherein the resinous aldehyde composition comprises a resinous formaldehyde composition.

16. The fine fiber of claim 15 wherein the resinous formaldehyde composition comprises a resinous melamine-formaldehyde composition.

17. The fine fiber of claim 1 wherein the resinous aldehyde composition comprises a melamine-aldehyde composition; and wherein the aldehyde comprises formaldehyde, acetaldehyde, butyraldehyde, isobutyraldehyde, or mixtures thereof.

18. The fine fiber of claim 1 wherein the resinous aldehyde composition comprises a condensation product of urea and an aldehyde, a condensation product of phenol and an aldehyde, a condensation product of melamine and an aldehyde, or a mixture thereof.

19. The fine fiber of claim 1 wherein the resinous aldehyde composition comprises a condensation product of benzoguanamine and an aldehyde, a condensation product of glycoluril and an aldehyde, or a mixture thereof.

20. A fine fiber comprising a core phase and a coating phase;
wherein the core phase comprises nylon and the coating phase comprises a resinous melamine-aldehyde composition; wherein at least a portion of the nylon is crosslinked by the resinous melamine-aldehyde composition; and further wherein the fine fiber is prepared from a resinous melamine-aldehyde composition in an amount of greater than 40 parts by weight per 100 parts by weight of the nylon and less than or equal to 100 parts by weight per 100 parts by weight of the polymer.

21. The fine fiber of claim 20 wherein the core phase further comprises a nonreactive polymer.

22. A filter media comprising a filtration substrate and a layer comprising a plurality of fine fibers of claim 1 disposed on the substrate.

23. The filter media of claim 22 wherein the fine fiber layer has a thickness of 0.05 μ to 30 μ.

24. The filter media of claim 22 wherein the filtration substrate is a non-woven substrate.

25. The filter media of claim 22 wherein the fine fiber layer is an electrospun layer and the filtration substrate comprises a cellulosic or synthetic nonwoven.

26. The filter media of claim 25 wherein the filtration substrate comprises a polyester nonwoven, a polyolefin nonwoven, or a blended nonwoven thereof.

27. The filter media of claim 26 wherein the filtration substrate comprises polypropylene nonwoven.

28. The filter media of claim 22 wherein the filtration substrate comprises a spunbonded or melt-blown support.

29. A filter element comprising a fine fiber filter media of claim 22.

30. A fine fiber prepared by a method comprising
preparing a solution comprising a polymer and a resinous aldehyde composition; and
electrospinning the solution to form the fine fiber, wherein
the fine fiber comprises a core phase and a coating phase,
the core phase comprises the polymer and the coating phase comprises the resinous aldehyde composition,
at least a portion of the polymer is crosslinked by the resinous aldehyde composition,
the resinous aldehyde composition is present in an amount of greater than or equal to 40 parts per weight per 100 parts per weight of the polymer and less than or equal to 100 parts by weight per 100 parts by weight of the polymer, and
the fine fiber does not include polyvinyl alcohol crosslinked with melamine-formaldehyde.

\* \* \* \* \*